(12) United States Patent
Kotian et al.

(10) Patent No.: US 12,552,827 B2
(45) Date of Patent: Feb. 17, 2026

(54) SYNTHESIS OF AN ANTIVIRAL AZASUGAR TRIPHOSPHATE

(71) Applicant: BioCryst Pharmaceuticals, Inc., Durham, NC (US)

(72) Inventors: Pravin L. Kotian, Hoover, AL (US); Zhao Dang, Vestavia Hills, AL (US); Minwan Wu, Vestavia Hills, AL (US)

(73) Assignee: BioCryst Pharmaceuticals, Inc., Durham, NC (US)

( * ) Notice: Subject to any disclaimer, the term of this patent is extended or adjusted under 35 U.S.C. 154(b) by 490 days.

(21) Appl. No.: 18/100,192

(22) Filed: Jan. 23, 2023

(65) Prior Publication Data

US 2023/0303611 A1    Sep. 28, 2023

Related U.S. Application Data

(60) Provisional application No. 63/301,695, filed on Jan. 21, 2022.

(51) Int. Cl.
  *C07H 19/14*   (2006.01)
  *C07D 207/50*  (2006.01)
  *C07D 487/04*  (2006.01)
  *C07H 1/04*    (2006.01)

(52) U.S. Cl.
  CPC .......... *C07H 19/14* (2013.01); *C07D 207/50* (2013.01); *C07D 487/04* (2013.01); *C07H 1/04* (2013.01)

(58) Field of Classification Search
  None
  See application file for complete search history.

(56) References Cited

U.S. PATENT DOCUMENTS

| | | |
|---|---|---|
| 9,492,452 B2 | 11/2016 | Bantia et al. |
| 9,499,554 B2 | 11/2016 | Sheridan et al. |
| 9,580,428 B2 | 2/2017 | Kotian et al. |
| 10,022,375 B2 | 7/2018 | Bantia et al. |
| 10,420,769 B2 | 9/2019 | Bantia et al. |
| 11,173,159 B2 | 11/2021 | Bantia et al. |
| 2022/0040190 A1 | 2/2022 | Bantia et al. |

FOREIGN PATENT DOCUMENTS

| | | | |
|---|---|---|---|
| WO | WO-2012/051570 A1 | 4/2012 | |
| WO | WO-2013/158746 A1 | 10/2013 | |
| WO | WO-2014078778 A2 * | 5/2014 | .............. A61P 31/12 |
| WO | WO-2014/186465 A1 | 11/2014 | |

* cited by examiner

*Primary Examiner* — Traviss C Mcintosh, III
(74) *Attorney, Agent, or Firm* — Foley Hoag LLP; Dana M. Gordon; Laura A. Wzorek

(57) ABSTRACT

Provided are methods of making the active 5'-triphosphate form of galidesivir (compound 1) and the active 5'-triphosphate form of azasugar nucleoside analogues (compound 2):

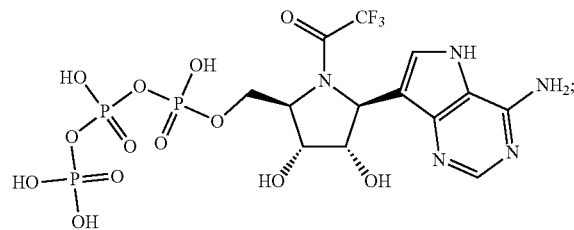

a potent anti-viral compound useful for broad spectrum treatment, suppression, and prevention of viral infections. The syntheses of compound 1 and compound 2 can be achieved via selective formation of protected intermediate 1b and protected intermediate 2b, respectively:

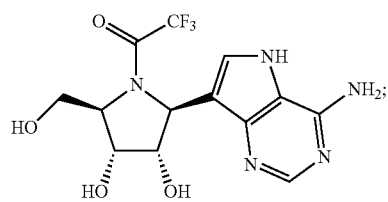

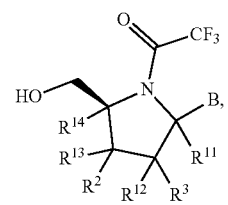

33 Claims, No Drawings

SYNTHESIS OF AN ANTIVIRAL AZASUGAR TRIPHOSPHATE

RELATED APPLICATIONS

This application claims the benefit of priority to U.S. Provisional Application for Patent Ser. No. 63/301,695, filed Jan. 21, 2022.

BACKGROUND OF THE INVENTION

Viral diseases are responsible for global pandemics and yearly seasonal epidemics, such as influenza. Outbreaks may be characterized by potentiated virulence and may occur suddenly, resulting in serious mortalities. Importantly, viral diseases are not limited to humans. For example, influenza also affects livestock and birds, which may have significant impact on food supply in addition to increasing the risk of transmission to humans. Exemplary conditions related to viral infection include, for example, influenza, small pox, encephalitis, Ebola virus, West Nile disease, yellow fever, Dengue fever, hepatitis, human immunodeficiency, polio, and Coxsackie.

The genome of the influenza A virus has an RNA-dependent RNA polymerase, which is a heterotrimeric complex of three subunits (PA, PB1 and PB2). The RNA polymerase catalyzes viral RNA transcription and replication. Because transcription and replication of the virus depends on the activity of RNA polymerase, this enzyme has become of interest as a target for development of new anti-viral compounds, especially in the wake of the recent emergence of drug resistant viruses.

Nucleoside analogs comprise the largest class of small-molecule drugs for treating viral infections. Some of these drugs are 5'-hydroxyl derivatives or corresponding ester prodrugs that are converted to their triphosphate form before interacting with viral polymerases and functioning as antiviral agents.

SUMMARY OF THE INVENTION

Provided is a simplified, readily scalable series of individual methods that collectively constitute a method for the synthesis of the 5'-triphosphate form of an azasugar nucleoside analogue.

The invention provides a method for the synthesis of the 5'-triphosphate form (1) of galidesivir from galidesivir (1a). Such a method may also be used for the synthesis of the 5'-triphosphate form (2) of an azasugar nucleoside analogue from compound 2a. The overall methods for the synthesis of the 5'-triphosphate form (1) of galidesivir and the 5'-triphosphate form (2) an azasugar nucleoside analogue are summarized in the drawings immediately below.

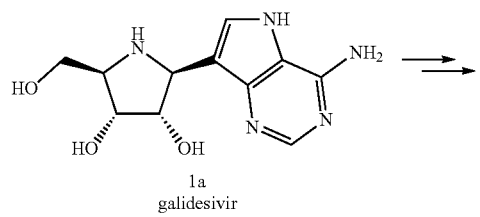

1a
galidesivir

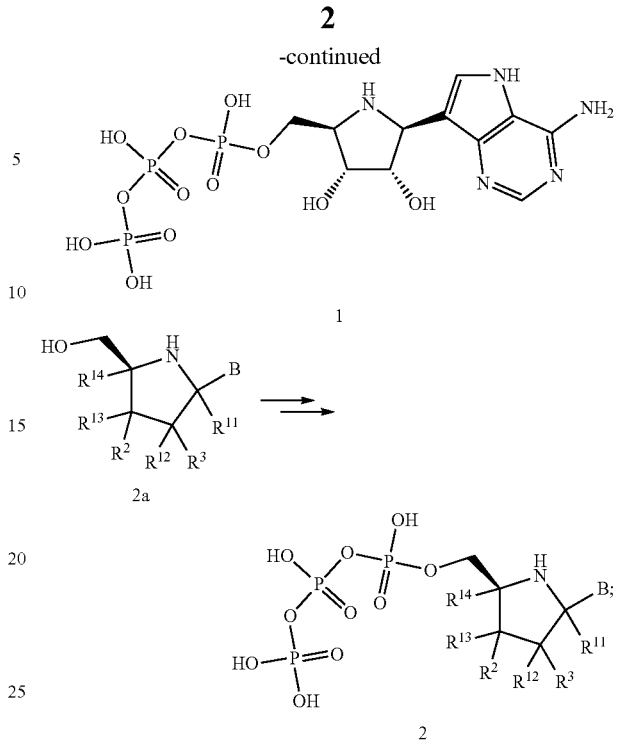

wherein for compounds 2a and 2:

B is a heterocyclic base;

$R^0$, independently for each occurrence, is selected from the group consisting of H, $C_1$-$C_6$alkyl, and C(O)—$C_1$-$C_6$alkyl;

$R^2$ and $R^3$ are each independently H, halide, azide, $C_1$-$C_6$alkyl, $C_1$-$C_6$alkenyl, $C_1$-$C_6$alkynyl, CN, $OR^0$, —C(O)$OR^{10}$, or $SR^0$;

or $R^2$ and $R^3$, taken together with the intervening atoms, form an optionally substituted fused heterocycloalkyl;

$R^{10}$, independently for each occurrence, is selected from the group consisting of H, $C_1$-$C_6$alkyl, aryl, heteroaryl, aralkyl, and heteroaralkyl;

$R^{11}$ is selected from the group consisting of H, $C_1$-$C_6$alkyl, $C_1$-$C_6$alkenyl, $C_1$-$C_6$alkynyl, $OR^0$, and CN;

$R^{12}$ and $R^{13}$ are each independently selected from the group consisting of H, $C_1$-$C_6$alkyl, $OR^0$, $C_1$-$C_6$alkenyl, $C_1$-$C_6$alkynyl, CN, azide, and halide; and $R^{14}$ is selected from the group consisting of H, $C_1$-$C_6$alkyl, $OR^0$, $C_1$-$C_6$alkynyl, CN, azide, and halide.

In some aspects, the invention provides a method of preparing compound 1b1 or a salt thereof, comprising combining compound 1b or a salt thereof and a phosphorylation reagent, thereby producing compound 1b1 or a salt thereof; wherein:

compound 1b1 is represented by and
compound 1b is represented by

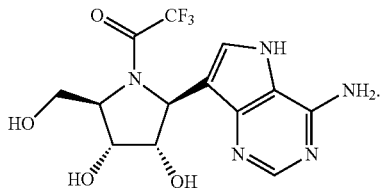

In some aspects, the invention provides a method of preparing compound 2b1 or a salt thereof, comprising combining compound 2b or a salt thereof and a phosphorylation reagent, thereby producing compound 2b1 or a salt thereof; wherein:
compound 2b1 is represented by

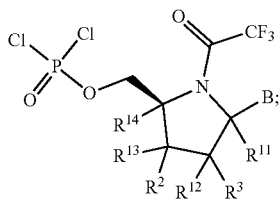

and
compound 2b is represented by

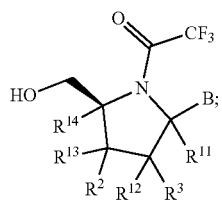

wherein for compounds 2b and 2b1:
B is a heterocyclic base;
$R^0$, independently for each occurrence, is selected from the group consisting of H, $C_1$-$C_6$alkyl, and C(O)—$C_1$-$C_6$alkyl;
$R^2$ and $R^3$ are each independently H, halide, azide, $C_1$-$C_6$alkyl, $C_1$-$C_6$alkenyl, $C_1$-$C_6$alkynyl, CN, $OR^0$, —C(O)$OR^{10}$, or $SR^0$;
or $R^2$ and $R^3$, taken together with the intervening atoms, form an optionally substituted fused heterocycloalkyl;
$R^{10}$, independently for each occurrence, is selected from the group consisting of H, $C_1$-$C_6$alkyl, aryl, heteroaryl, aralkyl, and heteroaralkyl;
$R^{11}$ is selected from the group consisting of H, $C_1$-$C_6$alkyl, $C_1$-$C_6$alkenyl, $C_1$-$C_6$alkynyl, $OR^0$, and CN;
$R^{12}$ and $R^{13}$ are each independently selected from the group consisting of H, $C_1$-$C_6$alkyl, $OR^0$, $C_1$-$C_6$alkenyl, $C_1$-$C_6$alkynyl, CN, azide, and halide; and
$R^{14}$ is selected from the group consisting of H, $C_1$-$C_6$alkyl, $OR^0$, $C_1$-$C_6$alkynyl, CN, azide, and halide.
In certain aspects, the invention provides a compound having the structure:

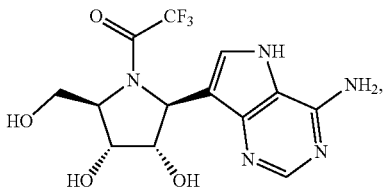

or a salt thereof.
In certain aspects, the invention provides a compound having the structure:

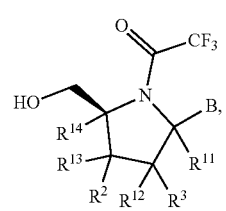

or a salt thereof
wherein for compound 2b:
B is a heterocyclic base;
$R^0$, independently for each occurrence, is selected from the group consisting of H, $C_1$-$C_6$alkyl, and C(O)—$C_1$-$C_6$alkyl;
$R^2$ and $R^3$ are each independently H, halide, azide, $C_1$-$C_6$alkyl, $C_1$-$C_6$alkenyl, $C_1$-$C_6$alkynyl, CN, $OR^0$, —C(O)$OR^{10}$, or $SR^0$;
or $R^2$ and $R^3$, taken together with the intervening atoms, form an optionally substituted fused heterocycloalkyl;
$R^{10}$, independently for each occurrence, is selected from the group consisting of H, $C_1$-$C_6$alkyl, aryl, heteroaryl, aralkyl, and heteroaralkyl;
$R^{11}$ is selected from the group consisting of H, $C_1$-$C_6$alkyl, $C_1$-$C_6$alkenyl, $C_1$-$C_6$alkynyl, $OR^0$, and CN;
$R^{12}$ and $R^{13}$ are each independently selected from the group consisting of H, $C_1$-$C_6$alkyl, $OR^0$, $C_1$-$C_6$alkenyl, $C_1$-$C_6$alkynyl, CN, azide, and halide; and
$R^{14}$ is selected from the group consisting of H, $C_1$-$C_6$alkyl, $OR^0$, $C_1$-$C_6$alkynyl, CN, azide, and halide.

DETAILED DESCRIPTION

Nucleoside analogs, including azasugar nucleoside analogues, are potent antiviral compounds useful for broad spectrum treatment, suppression, and prevention of viral infections. The 2-pyrimidinyl-5-(hydroxymethyl)pyrrolidine-2,3-diol adenosine analog depicted below, which is referred to alternatively as galidesivir or compound 1a, is a potent anti-viral compound useful for such purposes, as described in International Patent Application Publication No. WO 2012/051570, the contents of which are incorporated herein by reference.

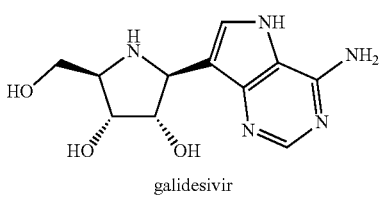

galidesivir

The biologically active 5'-triphosphate form of azasugar nucleoside analogs (i.e., compound 2 above), including the biologically active 5'-triphosphate form of galidesivir (i.e., compound 1 above) are formed in the cell. However, it is difficult to isolate and purify such biologically active 5'-triphosphate forms of nucleoside analogues from cells in sufficient quantities for use. Therefore, direct chemical synthesis of biologically active 5'-triphosphate forms would be useful in the art, such as, for example, for use as analytical standards.

The direct chemical synthesis of nucleoside triphosphates is complicated by the presence of multiple functional groups. For example, galidesivir includes 2'-, 3'-, and 5'-hydroxyl groups on the azasugar, an amino group on the azasugar, and amino groups present on the base. The differences in the reactivity of the various positions are often insufficient to convey sufficient regioselectivity for selective functionalization.

The present invention includes the discovery of an efficient synthetic route to compound 1 from galidesivir (1a), via selective formation of protected intermediate compound 1b:

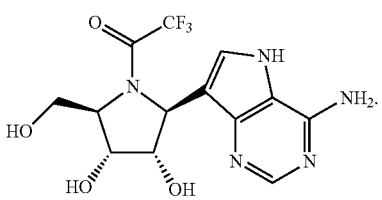

Such method may also be used to provide an efficient synthetic route to compound 2 from compound 2a, via selective formation of protected intermediate compound 2b:

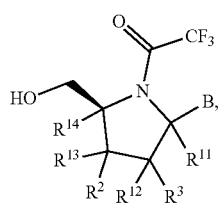

wherein the substituent groups of compound 2b are as described above.

Definitions

The articles "a" and "an" are used herein to refer to one or to more than one (i.e., to at least one) of the grammatical object of the article. By way of example, "an element" means one element or more than one element.

The term "alkyl" as used herein is a term of art and refers to saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight-chain or branched-chain alkyl has about 30 or fewer carbon atoms in its backbone (e.g., $C_1$-$C_{30}$ for straight chain, $C_3$-$C_{30}$ for branched chain), and alternatively, about 20 or fewer, or 10 or fewer. Representative examples of alkyl include, but are not limited to, methyl, ethyl, n-propyl, iso-propyl, n-butyl, sec-butyl, iso-butyl, tert-butyl, n-pentyl, isopentyl, neopentyl, and n-hexyl.

The term "cycloalkyl" means mono- or bicyclic or bridged saturated carbocyclic rings, each having from 3 to 12 carbon atoms. Certain cycloalkyls have from 5-12 carbon atoms in their ring structure, and may have 6-10 carbons in the ring structure.

The term "heterocyclyl" as used herein refers to a radical of a non-aromatic ring system, including, but not limited to, monocyclic, bicyclic, and tricyclic rings, which can be completely saturated or which can contain one or more units of unsaturation, for the avoidance of doubt, the degree of unsaturation does not result in an aromatic ring system, and having 3 to 12 atoms including at least one heteroatom, such as nitrogen, oxygen, or sulfur. For purposes of exemplification, which should not be construed as limiting the scope of this invention, the following are examples of heterocyclic rings: aziridinyl, azirinyl, oxiranyl, thiiranyl, thiirenyl, dioxiranyl, diazirinyl, azetyl, oxetanyl, oxetyl, thietanyl, thietyl, diazetidinyl, dioxetanyl, dioxetenyl, dithietanyl, dithietyl, furyl, dioxalanyl, pyrrolyl, oxazolyl, thiazolyl, imidazolyl, oxadiazolyl, thiadiazolyl, triazolyl, triazinyl, isothiazolyl, isoxazolyl, thiophenyl, pyrazolyl, tetrazolyl, pyridyl, pyridazinyl, pyrimidinyl, pyrazinyl, triazinyl, tetrazinyl, quinolinyl, isoquinolinyl, quinoxalinyl, quinazolinyl, pyridopyrazinyl, benzoxazolyl, benzothiophenyl, benzimidazolyl, benzothiazolyl, benzoxadiazolyl, benzthiadiazolyl, indolyl, benztriazolyl, naphthyridinyl, azepines, azetidinyl, morpholinyl, oxopiperidinyl, oxopyrrolidinyl, piperazinyl, piperidinyl, pyrrolidinyl, quinicludinyl, thiomorpholinyl, tetrahydropyranyl and tetrahydrofuranyl.

The term "heteroatom" is art-recognized, and includes an atom of any element other than carbon or hydrogen. Illustrative heteroatoms include boron, nitrogen, oxygen, phosphorus, sulfur and selenium, and alternatively oxygen, nitrogen or sulfur.

The term "cycloalkylalkyl" as used herein refers to an alkyl group substituted with one or more cycloalkyl groups.

The term "heterocycloalkylalkyl" as used herein refers to an alkyl group substituted with one or more heterocycloalkyl (i.e., heterocyclyl) groups.

The term "alkenyl" as used herein means a straight or branched chain hydrocarbon radical containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl. The unsaturated bond(s) of the alkenyl group can be located anywhere in the moiety and can have either the (Z) or the (E) configuration about the double bond(s).

The term "alkynyl" as used herein means a straight or branched chain hydrocarbon radical containing from 2 to 10 carbon atoms and containing at least one carbon-carbon triple bond. Representative examples of alkynyl include, but are not limited, to acetylenyl, 1-propynyl, 2-propynyl, 3-butynyl, 2-pentynyl, and 1-butynyl.

The term "alkylene" is art-recognized, and as used herein pertains to a diradical obtained by removing two hydrogen atoms of an alkyl group, as defined above. In one embodiment an alkylene refers to a disubstituted alkane, i.e., an alkane substituted at two positions with substituents such as halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, fluoroalkyl (such as trifluromethyl), cyano, or the like. That is, in one embodiment, a "substituted alkyl" is an "alkylene".

The term "amino" is a term of art and as used herein refers to both unsubstituted and substituted amines, e.g., a moiety that may be represented by the general formulas:

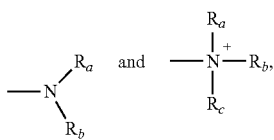

wherein $R_a$, $R_b$, and $R_c$ each independently represent a hydrogen, an alkyl, an alkenyl, —$(CH_2)_x$-Rd, or $R_a$ and $R_b$, taken together with the N atom to which they are attached complete a heterocycle having from 4 to 8 atoms in the ring structure; Rd represents an aryl, a cycloalkyl, a cycloalkenyl, a heterocyclyl or a polycyclyl; and x is zero or an integer in the range of 1 to 8. In certain embodiments, only one of $R_a$ or $R_b$ may be a carbonyl, e.g., $R_a$, $R_b$, and the nitrogen together do not form an imide. In other embodiments, $R_a$ and $R_b$ (and optionally $R_c$) each independently represent a hydrogen, an alkyl, an alkenyl, or —$(CH_2)_x$—$R_d$. In certain embodiments, the term "amino" refers to —$NH_2$.

The term "amido", as used herein, means —NHC(=O)—, wherein the amido group is bound to the parent molecular moiety through the nitrogen. Examples of amido include alkylamido such as $CH_3C$(=O)N(H)— and $CH_3CH_2C$(=O)N(H)—.

The term "acyl" is a term of art and as used herein refers to any group or radical of the form RCO— where R is any organic group, e.g., alkyl, aryl, heteroaryl, aralkyl, and heteroaralkyl.

Representative acyl groups include acetyl, benzoyl, and malonyl.

The term "aminoalkyl" as used herein refers to an alkyl group substituted with one or more one amino groups. In one embodiment, the term "aminoalkyl" refers to an aminomethyl group.

The term "aminoacyl" is a term of art and as used herein refers to an acyl group substituted with one or more amino groups.

The term "aminothionyl" as used herein refers to an analog of an aminoacyl in which the O of RC(O)— has been replaced by sulfur, hence is of the form RC(S)—.

The term "phosphoryl" is a term of art and as used herein may in general be represented by the formula:

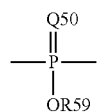

wherein Q50 represents S or O, and R59 represents hydrogen, a lower alkyl or an aryl; for example, —P(O)(OMe)— or —P(O)(OH)$_2$. When used to substitute, e.g., an alkyl, the phosphoryl group of the phosphorylalkyl may be represented by the general formulas:

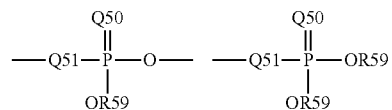

wherein Q50 and R59, each independently, are defined above, and Q51 represents O, S or N; for example, —O—P(O)(OH)OMe or —NH—P(O)(OH)$_2$. When Q50 is S, the phosphoryl moiety is a "phosphorothioate."

The term "aminophosphoryl" as used herein refers to a phosphoryl group substituted with at least one amino group, as defined herein; for example, —P(O)(OH)NMe$_2$.

The term "azide" or "azido", as used herein, means an —$N_3$ group.

The term "carbonyl" as used herein refers to —C(=O)—.

The term "thiocarbonyl" as used herein refers to —C(=S)—.

The term "alkylphosphoryl" as used herein refers to a phosphoryl group substituted with at least one alkyl group, as defined herein; for example, —P(O)(OH)Me.

The term "alkylthio" as used herein refers to alkyl-S—.

The term "carboxy", as used herein, means a —$CO_2H$ group.

The term "aryl" is a term of art and as used herein refers to includes monocyclic, bicyclic and polycyclic aromatic hydrocarbon groups, for example, benzene, naphthalene, anthracene, and pyrene. The aromatic ring may be substituted at one or more ring positions with one or more substituents, such as halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, fluoroalkyl (such as trifluromethyl), cyano, or the like. The term "aryl" also includes polycyclic ring systems having two or more cyclic rings in which two or more carbons are common to two adjoining rings (the rings are "fused rings") wherein at least one of the rings is an aromatic hydrocarbon, e.g., the other cyclic rings may be cycloalkyls, cycloalkenyls, cycloalkynyls, aryls, heteroaryls, and/or heterocyclyls. In certain embodiments, the term "aryl" refers to a phenyl group.

The term "heteroaryl" is a term of art and as used herein refers to a monocyclic, bicyclic, and polycyclic aromatic group having 3 to 12 total atoms including one or more heteroatoms such as nitrogen, oxygen, or sulfur in the ring structure, for example, azaindolyl, benzo(b)thienyl, benzimidazolyl, benzofuranyl, benzoxazolyl, benzothiazolyl, benzothiadiazolyl, benzotriazolyl, benzoxadiazolyl, furanyl, imidazolyl, imidazopyridinyl, indolyl, indolinyl, indazolyl, isoindolinyl, isoxazolyl, isothiazolyl, isoquinolinyl, oxadiazolyl, oxazolyl, purinyl, pyranyl, pyrazinyl, pyrazolyl, pyridinyl, pyrimidinyl, pyrrolyl, pyrrolo[2,3-d]pyrimidinyl, pyrazolo[3,4-d]pyrimidinyl, quinolinyl, quinazolinyl, triazolyl, thiazolyl, thiophenyl, tetrahydroindolyl, tetrazolyl, thiadiazolyl, thienyl, thiomorpholinyl, triazolyl or tropanyl, and the like. The "heteroaryl" may be substituted at one or more ring positions with one or more substituents such as halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, fluoroalkyl (such as trifluromethyl), cyano, or the like. The term "heteroaryl" also includes polycyclic ring systems having two or more cyclic rings in which two or more carbons are common to two adjoining rings (the rings are "fused rings") wherein at least one of the rings is an aromatic group having one or more heteroatoms in the ring structure, e.g., the other cyclic rings may be cycloalkyls, cycloalkenyls, cycloalkynyls, aryls, heteroaryls, and/or heterocyclyls.

The term "aralkyl" or "arylalkyl" is a term of art and as used herein refers to an alkyl group substituted with an aryl group, wherein the moiety is appended to the parent molecule through the alkyl group.

The term "heteroaralkyl" or "heteroarylalkyl" is a term of art and as used herein refers to an alkyl group substituted with a heteroaryl group, appended to the parent molecular moiety through the alkyl group.

The term "alkoxy" as used herein means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "alkoxycarbonyl" means an alkoxy group, as defined herein, appended to the parent molecular moiety through a carbonyl group, represented by —C(=O)—, as defined herein. Representative examples of alkoxycarbonyl include, but are not limited to, methoxycarbonyl, ethoxycarbonyl, and tert-butoxycarbonyl.

The term "alkylcarbonyl", as used herein, means an alkyl group, as defined herein, appended to the parent molecular moiety through a carbonyl group, as defined herein. Representative examples of alkylcarbonyl include, but are not limited to, acetyl, 1-oxopropyl, 2,2-dimethyl-1-oxopropyl, 1-oxobutyl, and 1-oxopentyl.

The term "arylcarbonyl", as used herein, means an aryl group, as defined herein, appended to the parent molecular moiety through a carbonyl group, as defined herein. Representative examples of arylcarbonyl include, but are not limited to, benzoyl and (2-pyridinyl)carbonyl.

The term "alkylcarbonyloxy" and "arylcarbonyloxy", as used herein, means an alkylcarbonyl or arylcarbonyl group, as defined herein, appended to the parent molecular moiety through an oxygen atom. Representative examples of alkylcarbonyloxy include, but are not limited to, acetyloxy, ethylcarbonyloxy, and tert-butylcarbonyloxy. Representative examples of arylcarbonyloxy include, but are not limited to phenylcarbonyloxy.

The term "alkenoxy" or "alkenoxyl" means an alkenyl group, as defined herein, appended to the parent molecular moiety through an oxygen atom. Representative examples of alkenoxyl include, but are not limited to, 2-propen-1-oxyl (i.e., $CH_2=CH-CH_2-O-$) and vinyloxy (i.e., $CH_2=CH-O-$).

The term "aryloxy" as used herein means an aryl group, as defined herein, appended to the parent molecular moiety through an oxygen atom.

The term "heteroaryloxy" as used herein means a heteroaryl group, as defined herein, appended to the parent molecular moiety through an oxygen atom.

The term "carbocyclyl" as used herein means a monocyclic or multicyclic (e.g., bicyclic, tricyclic, etc.) hydrocarbon radical containing from 3 to 12 carbon atoms that is completely saturated or has one or more unsaturated bonds, and for the avoidance of doubt, the degree of unsaturation does not result in an aromatic ring system (e.g., phenyl). Examples of carbocyclyl groups include 1-cyclopropyl, 1-cyclobutyl, 2-cyclopentyl, 1-cyclopentenyl, 3-cyclohexyl, 1-cyclohexenyl and 2-cyclopentenylmethyl.

The term "cyano" is a term of art and as used herein refers to —CN.

The term "halo" is a term of art and as used herein refers to —F, —Cl, —Br, or —I.

The term "haloalkyl" as used herein refers to an alkyl group, as defined herein, wherein some or all of the hydrogens are replaced with halogen atoms.

The term "hydroxy" is a term of art and as used herein refers to —OH.

The term "hydroxyalkyl", as used herein, means at least one hydroxy group, as defined herein, is appended to the parent molecular moiety through an alkyl group, as defined herein. Representative examples of hydroxyalkyl include, but are not limited to, hydroxymethyl, 2-hydroxyethyl, 3-hydroxypropyl, 2,3-dihydroxypentyl, and 2-ethyl-4-hydroxyheptyl.

The term "silyl", as used herein, includes hydrocarbyl derivatives of the silyl ($H_3Si-$) group (i.e., (hydrocarbyl)$_3Si-$), wherein a hydrocarbyl groups are univalent groups formed by removing a hydrogen atom from a hydrocarbon, e.g., ethyl, phenyl. The hydrocarbyl groups can be combinations of differing groups which can be varied in order to provide a number of silyl groups, such as trimethylsilyl (TMS), tert-butyldiphenylsilyl (TBDPS), tert-butyldimethylsilyl (TBS/TBDMS), triisopropylsilyl (TIPS), and [2-(trimethylsilyl)ethoxy]methyl (SEM).

The term "silyloxy", as used herein, means a silyl group, as defined herein, is appended to the parent molecule through an oxygen atom.

Certain compounds contained in compositions of the present invention may exist in particular geometric or stereoisomeric forms. In addition, compounds of the present invention may also be optically active. The present invention contemplates all such compounds, including cis- and trans-isomers, (R)- and (S)-enantiomers, diastereoisomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

If, for instance, a particular enantiomer of compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, fragmentation, decomposition, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds.

The term "protecting group" as used herein temporary substituents which protect a potentially reactive functional group from undesired chemical transformations. Examples of such protecting groups include esters of carboxylic acids and boronic acids, ethers of alcohols, and acetals and ketals of aldehydes and ketones. For instance, the phrase "N-terminal protecting group" or "amino-protecting group" as used herein refers to various amino-protecting groups which can be employed to protect the N-terminus of an amino acid or peptide against undesirable reactions during synthetic procedures. Examples of suitable groups include acyl protecting groups such as, to illustrate, formyl, dansyl, acetyl, benzoyl, trifluoroacetyl, succinyl, and methoxysuccinyl; aromatic urethane protecting groups as, for example, benzyloxycarbonyl (Cbz); and aliphatic urethane protecting groups such as t-butoxycarbonyl (Boc) or 9-Fluorenylmethoxycarbonyl (Fmoc).

The term "amino-protecting group" or "N-terminal protecting group" refers to those groups intended to protect the α-N-terminal of an amino acid or peptide or to otherwise protect the amino group of an amino acid or peptide against undesirable reactions during synthetic procedures. Commonly used N-protecting groups are disclosed in Greene, Protective Groups In Organic Synthesis, (John Wiley & Sons, New York (1981)), which is hereby incorporated by reference. Additionally, protecting groups can be used as pro-drugs which are readily cleaved in vivo, for example, by enzymatic hydrolysis, to release the biologically active parent. α-N-protecting groups comprise lower alkanoyl groups such as formyl, acetyl ("Ac"), propionyl, pivaloyl, t-butylacetyl and the like; other acyl groups include 2-chloroacetyl, 2-bromoacetyl, trifluoroacetyl, trichloroacetyl, phthalyl, o-nitrophenoxyacetyl, -chlorobutyryl, benzoyl, 4-chlorobenzoyl, 4-bromobenzoyl, 4-nitrobenzoyl and the like; sulfonyl groups such as benzenesulfonyl, p-toluenesulfonyl and the like; carbamate forming groups such as benzyloxycarbonyl, p-chlorobenzyloxycarbonyl, p-methoxybenzyloxycarbonyl, p-nitrobenzyloxycarbonyl, 2-nitrobenzyloxycarbonyl, p-bromobenzyloxycarbonyl, 3,4-dimethoxybenzyloxycarbonyl, 3,5-dimethoxybenzyloxycarbonyl, 2,4-dimethoxybenzyloxycarbonyl, 4-ethoxybenzyloxycarbonyl, 2-nitro-4,5-dimethoxybenzyloxycarbonyl, 3,4,5-trimethoxybenzyloxycarbonyl, 1-(p-biphenylyl)-1-methylethoxycarbonyl, α,α-dimethyl-3,5-dimethoxybenzyloxycarbonyl, benzhydryloxycarbonyl, t-butyoxycarbonyl, diisopropylmethoxycarbonyl, isopropyloxycarbonyl, ethoxycarbonyl, methoxycarbonyl, allyloxycarbonyl, 2,2,2-trichloroethoxycarbonyl, phenoxycarbonyl, 4-nitrophenoxycarbonyl, fluorenyl-9-methoxycarbonyl, cyclopentyloxycarbonyl, adamantyloxycarbonyl, cyclohexyloxycarbonyl, phenylthiocarbonyl and the like; arylalkyl groups such as benzyl, triphenylmethyl, benzyloxymethyl, 9-fluorenylmethyloxycarbonyl (Fmoc) and the like and silyl groups such as trimethylsilyl and the like. Still other examples include theyl, succinyl, methoxysuccinyl, subery, adipyl, azelayl, dansyl, benzyloxycarbonyl, methoxyazelaly, methoxyadipyl, methoxysuberyl, and 2,4-dinitrophenyl.

The term "carboxy protecting group" or "C-terminal protecting group" refers to a carboxylic acid protecting ester or amide group employed to block or protect the carboxylic acid functionality while the reactions involving other functional sites of the compound are performed. Carboxy protecting groups are disclosed in Greene, Protective Groups in Organic Synthesis pp. 152-186 (1981), which is hereby incorporated by reference. Additionally, a carboxy protecting group can be used as a pro-drug whereby the carboxy protecting group can be readily cleaved in vivo, for example by enzymatic hydrolysis, to release the biologically active parent. Such carboxy protecting groups are well known to those skilled in the art, having been extensively used in the protection of carboxyl groups in the penicillin and cephalosporin fields as described in U.S. Pat. Nos. 3,840,556 and 3,719,667, the disclosures of which are hereby incorporated herein by reference. Representative carboxy protecting groups are $C_1$-$C_8$ loweralkyl (e.g., methyl, ethyl or t-butyl and the like); arylalkyl such as phenethyl or benzyl and substituted derivatives thereof such as alkoxybenzyl or nitrobenzyl groups and the like; arylalkenyl such as phenylethenyl and the like; aryl and substituted derivatives thereof such as 5-indanyl and the like; dialkylaminoalkyl such as dimethylaminoethyl and the like); alkanoyloxyalkyl groups such as acetoxymethyl, butyryloxymethyl, valeryloxymethyl, isobutyryloxymethyl, isovaleryloxymethyl, 1-(propionyloxy)-1-ethyl, 1-(pivaloyloxyl)-1-ethyl, 1-methyl-1-(propionyloxy)-1-ethyl, pivaloyloxymethyl, propionyloxymethyl and the like; cycloalkanoyloxyalkyl groups such as cyclopropylcarbonyloxymethyl, cyclobutylcarbonyloxymethyl, cyclopentylcarbonyloxymethyl, cyclohexylcarbonyloxymethyl and the like; aroyloxyalkyl such as benzoyloxymethyl, benzoyloxyethyl and the like; arylalkylcarbonyloxyalkyl such as benzylcarbonyloxymethyl, 2-benzylcarbonyloxyethyl and the like; alkoxycarbonylalkyl or cycloalkyloxycarbonylalkyl such as methoxycarbonylmethyl, cyclohexyloxycarbonylmethyl, 1-methoxycarbonyl-1-ethyl and the like; alkoxycarbonyloxyalkyl or cycloalkyloxycarbonyloxyalkyl such as methoxycarbonyloxymethyl, t-butyloxycarbonyloxymethyl, 1-ethoxycarbonyloxy-1-ethyl, 1-cyclohexyloxycarbonyloxy-1-ethyl and the like; aryloxycarbonyloxyalkyl such as 2-(phenoxycarbonyloxy)ethyl, 2-(5-indanyloxycarbonyloxy)ethyl and the like; alkoxyalkylcarbonyloxyalkyl such as 2-(1-methoxy-2-methylpropan-2-oyloxy)ethyl and like; arylalkyloxycarbonyloxyalkyl such as 2-(benzyloxycarbonyloxy)ethyl and the like; arylalkenyloxycarbonyloxyalkyl such as 2-(3-phenylpropen-2-yloxycarbonyloxy)ethyl and the like; alkoxycarbonylaminoalkyl such as t-butyloxycarbonylaminomethyl and the like; alkylaminocarbonylaminoalkyl such as methylaminocarbonylaminomethyl and the like; alkanoylaminoalkyl such as acetylaminomethyl and the like; heterocycliccarbonyloxyalkyl such as 4-methylpiperazinylcarbonyloxymethyl and the like; dialkylaminocarbonylalkyl such as dimethylaminocarbonylmethyl, diethylaminocarbonylmethyl and the like; (5-(loweralkyl)-2-oxo-1,3-dioxolen-4-yl)alkyl such as (5-t-butyl-2-oxo-1,3-dioxolen-4-yl)methyl and the like; and (5-phenyl-2-oxo-1,3-dioxolen-4-yl)alkyl such as (5-phenyl-2-oxo-1,3-dioxolen-4-yl)methyl and the like. Representative amide carboxy protecting groups are aminocarbonyl and loweralkylaminocarbonyl groups. For example, aspartic acid may be protected at the α-C-terminal by an acid labile group (e.g., t-butyl) and protected at the O—C-terminal by a hydrogenation labile group (e.g., benzyl) then deprotected selectively during synthesis. As mentioned above, the protected carboxy group may also be a loweralkyl, cycloalkyl or arylalkyl ester, for example, methyl ester, ethyl ester, propyl ester, isopropyl ester, butyl ester, sec-butyl ester, isobutyl ester, amyl ester, isoamyl ester, octyl ester, cyclohexyl ester, phenylethyl ester and the like or an alkanoyloxyalkyl, cycloalkanoyloxyalkyl, aroyloxyalkyl or an arylalkylcarbonyloxyalkyl ester.

For purposes of the invention, the chemical elements are identified in accordance with the Periodic Table of the Elements, CAS version, Handbook of Chemistry and Physics, 67th Ed., 1986-87, inside cover.

Other chemistry terms herein are used according to conventional usage in the art, as exemplified by The McGraw-Hill Dictionary of Chemical Terms (ed. Parker, S., 1985), McGraw-Hill, San Francisco, incorporated herein by reference). Unless otherwise defined, all technical and scientific terms used herein have the same meaning as commonly understood by one of ordinary skill in the art to which this invention pertains.

As used herein, a protic solvent is a solvent that has a hydrogen atom bound to an oxygen (as in a hydroxyl group) or a nitrogen (as in an amine group). In general, any solvent that contains a labile H is a protic solvent. The molecules of such solvents readily donate protons ($H^+$) to reagents. In contrast, an aprotic solvent is a solvent that does not have a hydrogen atom bound to an oxygen (as in a hydroxyl group) or a nitrogen (as in an amine group), and it cannot donate hydrogen.

As used herein, a polar protic solvent is a protic solvent that will dissolve many salts. In general, these solvents have high dielectric constants and high polarity. Non-limiting examples of polar protic solvents include acetic acid, ammonia, ethanol, formic acid, isopropanol, methanol, n-butanol, nitromethane, n-propanol, t-butanol, and water.

As used herein, a polar aprotic solvent is a solvent that lacks an acidic hydrogen and generally has an intermediate to high dielectric constant and polarity. Non-limiting examples of polar aprotic solvents include acetone, acetonitrile, dichloromethane (DCM), dimethyl sulfoxide (DMSO), ethyl acetate, hexamethylphosphoric triamide (HMPT), N,N-dimethylformamide (DMF), and tetrahydrofuran (THF).

As used herein, a nonpolar aprotic solvent is a solvent that will dissolve many salts, but lacks an acidic hydrogen; these solvents generally have low dielectric constants and polarity. Non-limiting examples of nonpolar aprotic solvents include benzene, chloroform, cyclohexane, diethyl ether, hexane, pentane, and toluene.

As used herein, "phosphorylation reagent" refers to one or more reagents that provide a phosphoryl group to another compound. Phosphorylation reagents encompasses compounds which can phosphorylate a hydroxyl group directly as well agents which, when coupled with addition of a subsequent phosphorylation reagent, can phosphorylate hydroxyl groups indirectly, i.e., in a multi-step reaction sequence. For example, phosphorylation reagents of the present disclosure may provide a phosphoryl group to an alcohol, such as a 5'-hydroxyl group of a nucleoside analog. Examples of phosphorylation reagents include, but are not limited to, phosphorus oxychloride, pyrophosphoric acid, and pyrophosphate salts.

As used herein, "acylating reagent" refers to one or more reagents that provide an acyl group, e.g., a trifluoroacyl group, to another compound. Examples of acylating reagents include, but are not limited to, anhydrides, acid halides, acyl imidazoles, and other activated carboxylic acid derviatives.

As used herein, "deprotection reagent" refers to one or more reagents that, when added to a compound having a protecting group, remove that protecting group from a potential reactive functional group.

Methods of the Invention

The present invention provides methods of synthesizing the 5'-triphosphate form (1) of galidesivir from galidesivir (1a). Compound 1 may be synthesized via selective formation of protected intermediate compound 1b, represented generally by Scheme 1.

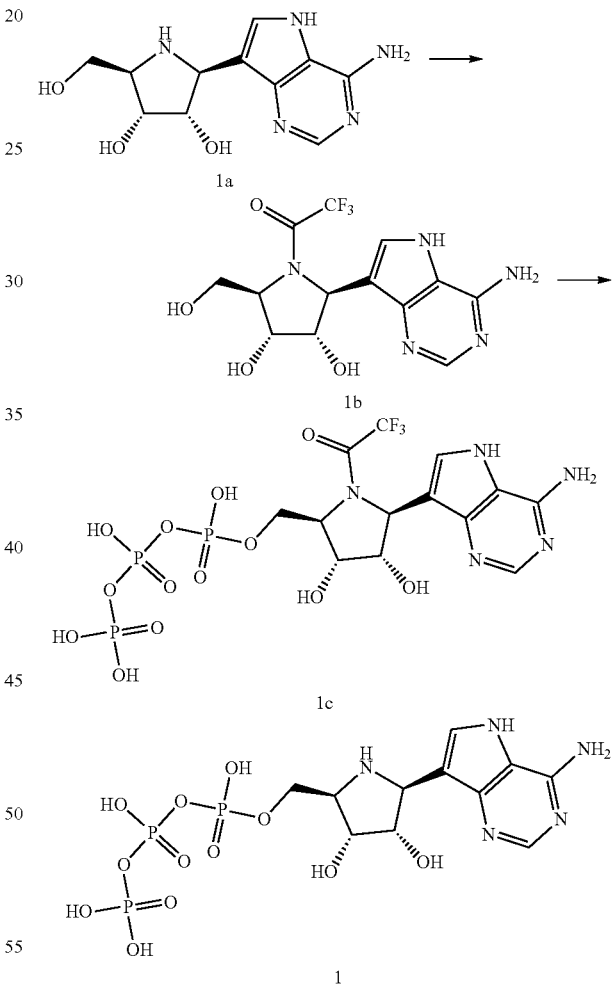

Accordingly, in certain embodiments, the invention provides a method of preparing compound 1 or a salt thereof comprising combining compound 1b or a salt thereof and a phosphorylation reagent.

Such methods may be used to synthesize the 5'-triphosphate form (2) of azasugar nucleoside analogues from 2a. Compound 2 may be synthesized via selective formation of protected intermediate compound 2b, represented generally by Scheme 2.

Scheme 2: Synthesis of the 5'-triphosphate form of azasugar nucleoside analogues

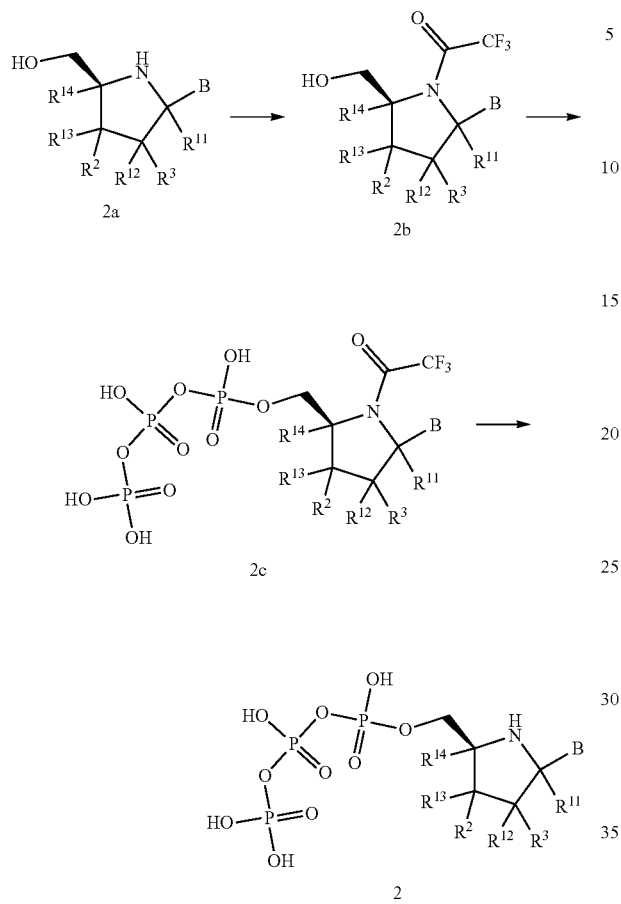

For compounds 2a, 2b, 2c, and 2 the substituent groups are defined as follows:

B is a heterocyclic base;

$R^0$, independently for each occurrence, is selected from the group consisting of H, $C_1$-$C_6$alkyl, and C(O)—$C_1$-$C_6$alkyl;

$R^2$ and $R^3$ are each independently H, halide, azide, $C_1$-$C_6$alkyl, $C_1$-$C_6$alkenyl, $C_1$-$C_6$alkynyl, CN, $OR^0$, —C(O)$OR^{10}$, or $SR^0$;

or $R^2$ and $R^3$, taken together with the intervening atoms, form an optionally substituted fused heterocycloalkyl;

$R^{10}$, independently for each occurrence, is selected from the group consisting of H, $C_1$-$C_6$alkyl, aryl, heteroaryl, aralkyl, and heteroaralkyl;

$R^{11}$ is selected from the group consisting of H, $C_1$-$C_6$alkyl, $C_1$-$C_6$alkenyl, $C_1$-$C_6$alkynyl, $OR^0$, and CN;

$R^{12}$ and $R^{13}$ are each independently selected from the group consisting of H, $C_1$-$C_6$alkyl, $OR^0$, $C_1$-$C_6$alkenyl, $C_1$-$C_6$alkynyl, CN, azide, and halide; and $R^{14}$ is selected from the group consisting of H, $C_1$-$C_6$alkyl, $OR^0$, $C_1$-$C_6$alkynyl, CN, azide, and halide.

In certain aspects of this embodiment, the azasugar portion of compounds 2a, 2b, 2c, and 2 is selected from the group consisting of:

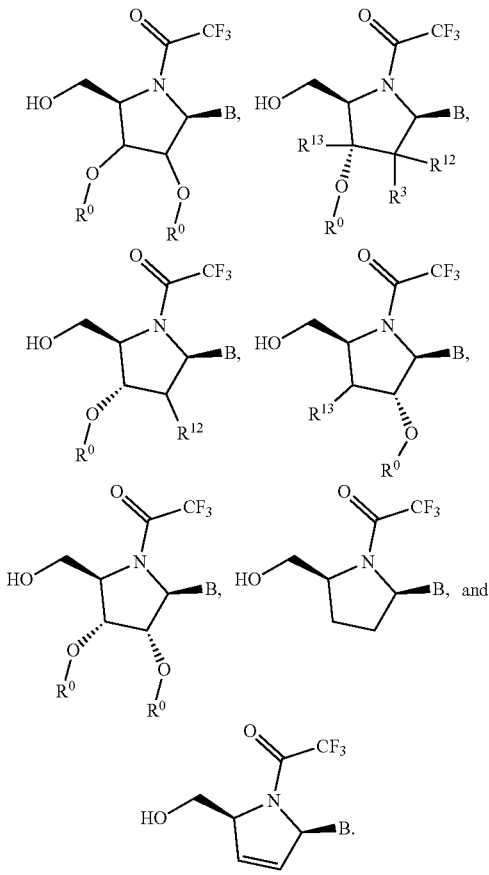

wherein:

B is a heterocyclic base;

$R^0$, independently for each occurrence, is selected from the group consisting of H, $C_1$-$C_6$alkyl, and C(O)—$C_1$-$C_6$alkyl;

$R^2$ and $R^3$ are each independently H, halide, azide, $C_1$-$C_6$alkyl, $C_1$-$C_6$alkenyl, $C_1$-$C_6$alkynyl, CN, $OR^0$, —C(O)$OR^{10}$, or $SR^0$;

or $R^2$ and $R^3$, taken together with the intervening atoms, form an optionally substituted fused heterocycloalkyl;

$R^{10}$, independently for each occurrence, is selected from the group consisting of H, $C_1$-$C_6$alkyl, aryl, heteroaryl, aralkyl, and heteroaralkyl; and $R^{12}$ and $R^{13}$ are each independently selected from the group consisting of H, $C_1$-$C_6$alkyl, $C_1$-$C_6$alkenyl, $C_1$-$C_6$alkynyl, $OR^0$, CN, azide, and halide.

In certain preferred embodiments, $R^2$ and $R^3$ are each independently H, halide, or OH and $R^{12}$ and $R^{13}$ are each independently H, halide, OH, or alkyl.

In certain aspects of this embodiment, the azasugar portion of compounds 2a, 2b, 2c, and 2 is selected from the group consisting of:

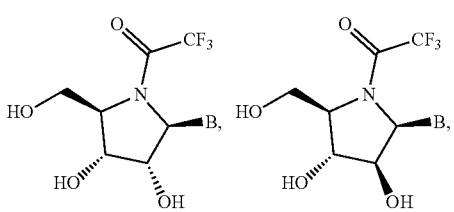

-continued
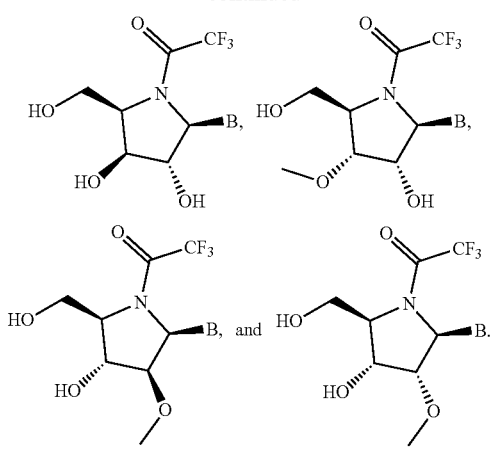
wherein:
B is a heterocyclic base.
In certain aspects of this embodiment, the azasugar portion of compounds 2a, 2b, 2c, and 2 is selected from the group consisting of:
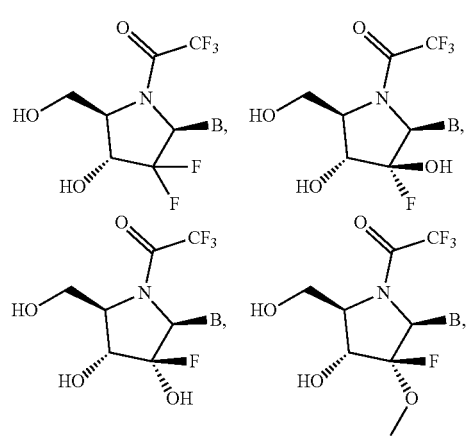
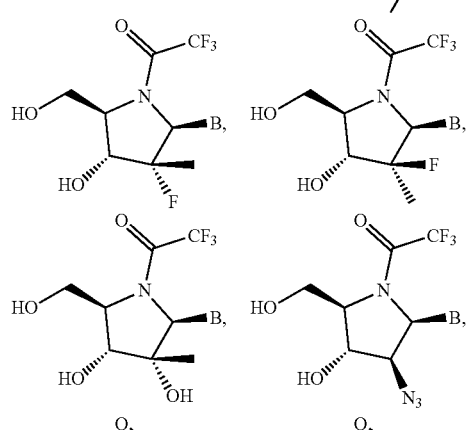
-continued
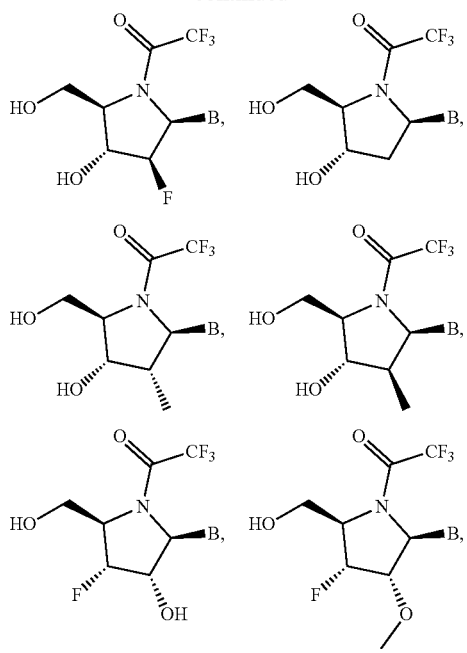
In any of the foregoing embodiments, B may be selected from the groups consisting of:
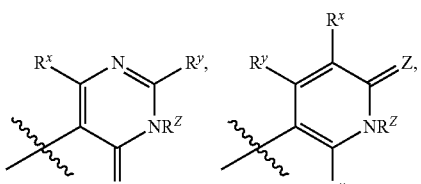
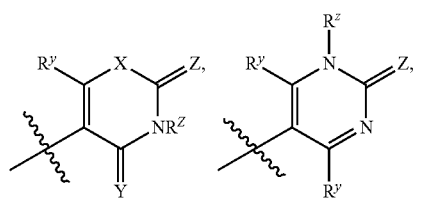

-continued

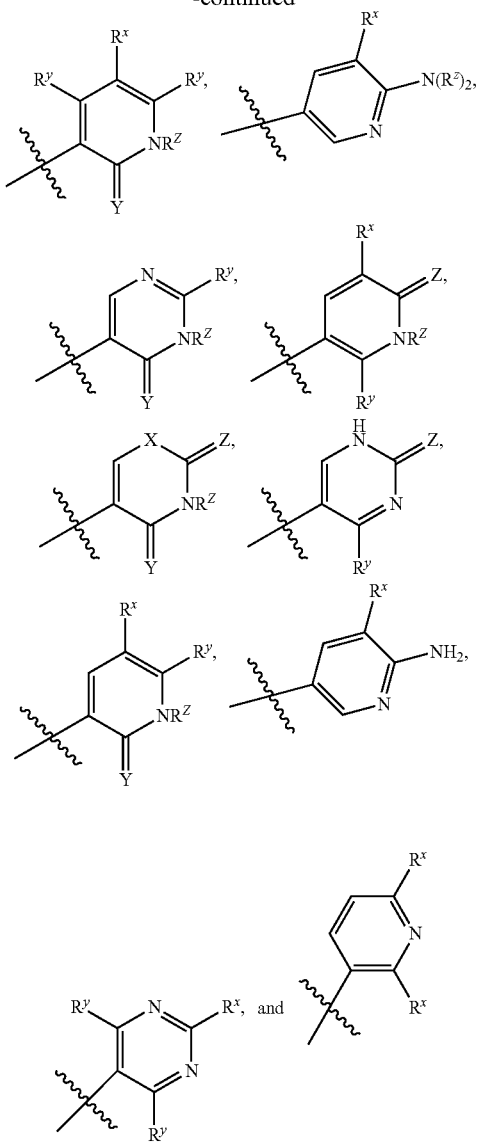

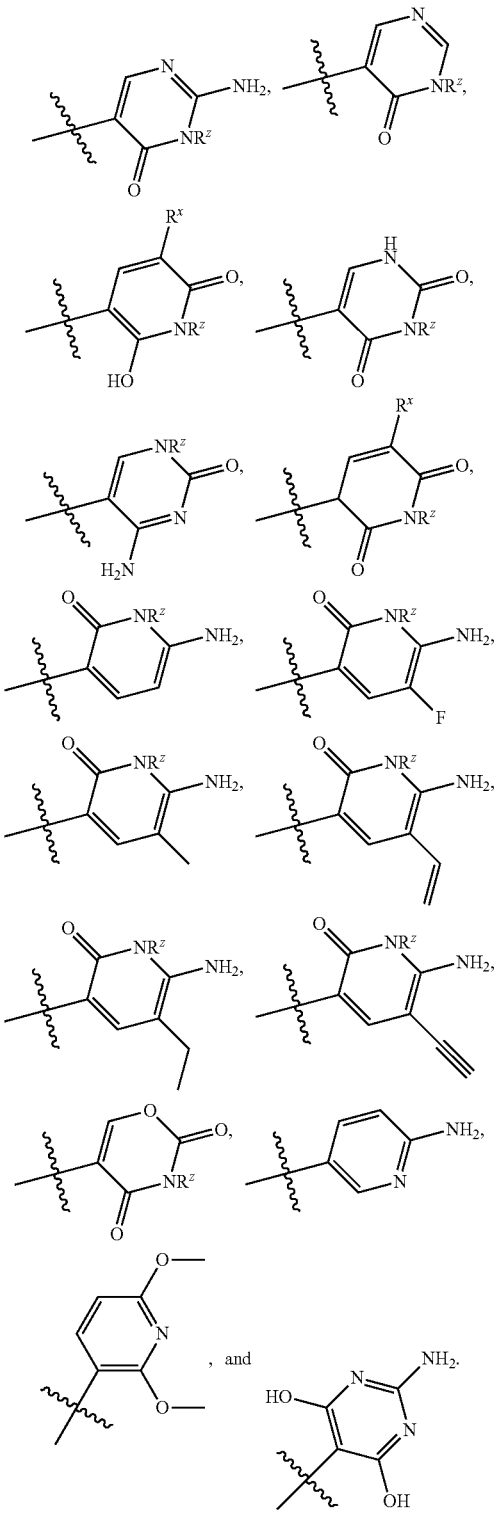

wherein:
X is selected from the group consisting of O, S, and NR$^{15}$;
R$^{15}$, independently for each occurrence, is selected from the group consisting of H, C$_1$-C$_6$alkyl, aryl, heteroaryl, aralkyl, and heteroaralkyl;
R$^x$, independently for each occurrence, is selected from the group consisting of H, C$_1$-C$_6$alkyl, OR$^Z$, C$_1$-C$_6$alkenyl, C$_1$-C$_6$alkynyl, CN, N(R$^Z$)$_2$, NO$_2$, azide, halide, aryl, and heteroaryl;
R$^Z$, independently for each occurrence, is H or C$_1$-C$_6$alkyl;
R$^y$, independently for each occurrence, is selected from the group consisting of H, C$_1$-C$_6$alkyl, OR$^Z$, C$_1$-C$_6$alkenyl, C$_1$-C$_6$alkynyl, CN, N(R$^Z$)$_2$, and halide;
Y is selected from the group consisting of O and S;
Z is selected from the group consisting of O and S;
In any of the foregoing embodiments, B may be selected from the groups consisting of:

wherein:
R$^Z$, independently for each occurrence, is H or C$_1$-C$_6$alkyl.
In certain embodiments R$^Z$, is H.
In any of the foregoing embodiments, B may be selected from the groups consisting of:

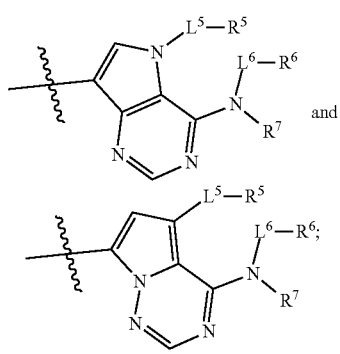

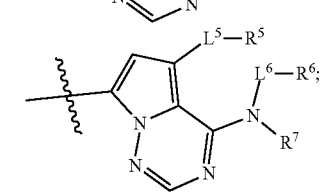

wherein
$L^5$ and $L^6$, each independently, are a bond or —C(R$^Z$)$_2$—O—;
$L^7$ is a bond, O, —C(R$^Z$)$_2$—O—, —C(R$^Z$)$_2$—S—, or —C(R$^Z$)$_2$—NH—;
$R^Z$, independently for each occurrence, is H or $C_1$-$C_6$alkyl;
$R^5$ and $R^6$ are, each independently, selected from the group consisting of H, $C_1$-$C_6$alkyl, $C_3$-$C_8$cycloalkyl, alkenyl, alkynyl, $C_1$-$C_8$acyl, alkylthio, aryl, aralkyl, heteroaryl, and heteroaralkyl; or $R^5$ may be absent;
$R^7$ is H; or $L^6$ is a bond and $R^6$, $R^7$, and the nitrogen to which they are bonded, taken together, represent —N=CR$^{20}$R$^{21}$; and
$R^{20}$ and $R^{21}$, each independently, are selected from the group consisting of H, $C_1$-$C_6$alkyl, amino, aryl, heteroaryl, aralkyl, and heteroaralkyl.

In certain embodiments, $L^5$-$R^5$ is H.

In any of the foregoing embodiments, B may be selected from the groups consisting of:

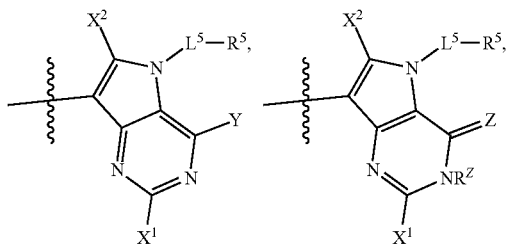

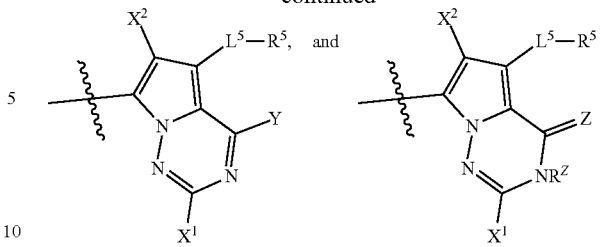

$L^5$ is a bond or —C(R$^Z$)$_2$—O—;
$R^Z$, independently for each occurrence, is H or $C_1$-$C_6$alkyl;
$R^5$ is selected from the group consisting of $C_1$-$C_6$alkyl, alkenyl, alkynyl, aryl, heteroaryl, aralkyl, heteroaralkyl, $C_1$-$C_6$acyl, or carboxyl; or $R^4$ may be absent;
$X^1$ is selected from the group consisting of H, N(R$^Z$)$_2$, SH, thioalkyl, OR$^Z$, alkenyl, alkynyl, CN, and halide;
$X^2$ is selected from the group consisting of H, N(R$^Z$)$_2$, SH, thioalkyl, OR$^Z$, O-aryl, O-heteroaryl, alkenyl, alkynyl, $C_1$-$C_6$acyl, carboxyl, CN, azide, and halide;
Y is selected from the group consisting of H, OR$^Z$, N(R$^{16}$)(R$^{17}$), SH, thioalkyl, O-aryl, O-heteroaryl, and halide;
Z is selected from the group consisting of O and S;
$R^{16}$ and $R^{17}$ are each independently selected from the group consisting of H, $C_1$-$C_6$alkyl, $C_3$-$C_8$cycloalkyl, $C_1$-$C_6$alkenyl, $C_1$-$C_6$alkynyl, $C_1$-$C_8$acyl, C(O)-alkyl, C(O)—O-alkyl, C(O)-cycloalkylalkyl, C(O)-cycloalkyl, alkoxy, amino, alkylthio, aryl, aralkyl, heteroaryl, and heteroaralkyl; or
$R^{16}$, $R^{17}$, and the nitrogen to which they are bonded, taken together, represent —N=CR$^{20}$R$^{21}$; and
$R^{20}$ and $R^{21}$ are each independently selected from the group consisting of H, $C_1$-$C_6$alkyl, amino, aryl, heteroaryl, aralkyl, and heteroaralkyl.

In certain embodiments, $L^5$-$R^5$ is H.

In certain embodiments, compound 2a is selected from Table 1 below. The synthesis of the compounds in Table 1 is carried out by methods known in the art and as described in International Patent Application Publication WO 2014/078778, the contents of which are hereby incorporated by reference with regard to the disclosed synthetic methods.

TABLE 1

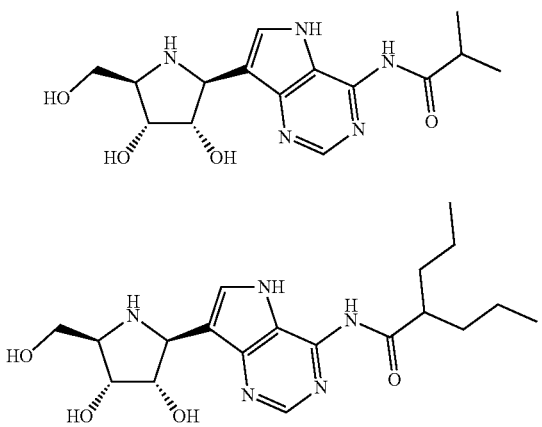

TABLE 1-continued
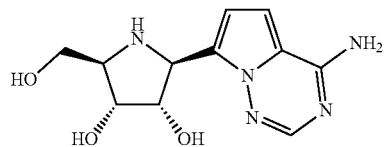 [SMILES: Nc1ncnn2c([C@@H]3N[C@H](CO)[C@@H](O)[C@H]3O)ccc12]
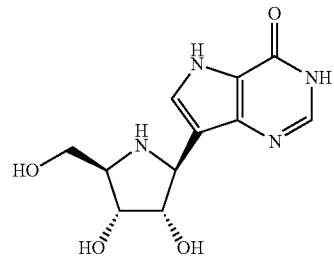 [SMILES: O=c1[nH]cnc2c([C@@H]3N[C@H](CO)[C@@H](O)[C@H]3O)c[nH]c12]
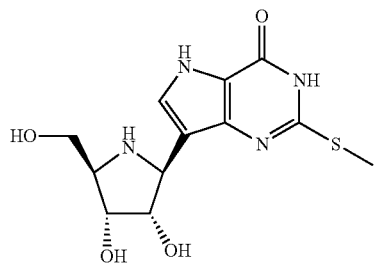 [SMILES: CSc1nc2c([C@@H]3N[C@H](CO)[C@@H](O)[C@H]3O)c[nH]c2c(=O)[nH]1]
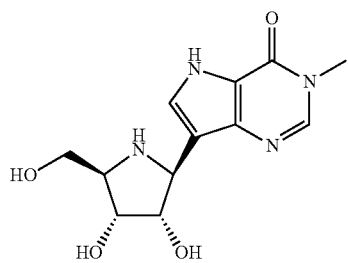 [SMILES: Cn1cnc2c([C@@H]3N[C@H](CO)[C@@H](O)[C@H]3O)c[nH]c2c1=O]
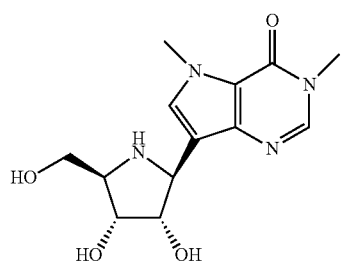 [SMILES: Cn1cnc2c([C@@H]3N[C@H](CO)[C@@H](O)[C@H]3O)cn(C)c2c1=O]
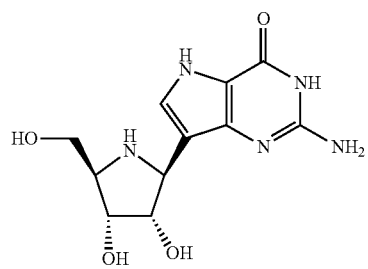 [SMILES: Nc1nc2c([C@@H]3N[C@H](CO)[C@@H](O)[C@H]3O)c[nH]c2c(=O)[nH]1]

TABLE 1-continued
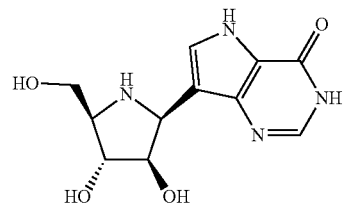 [SMILES: O=c1[nH]cnc2c([C@@H]3N[C@H](CO)[C@@H](O)[C@@H]3O)c[nH]c12]
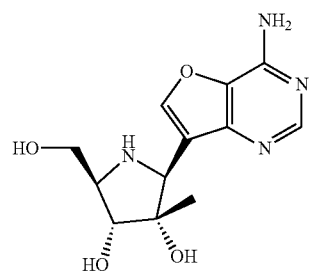 [SMILES: C[C@@]1(O)[C@H](O)[C@@H](CO)N[C@H]1c1coc2c(N)ncnc12]
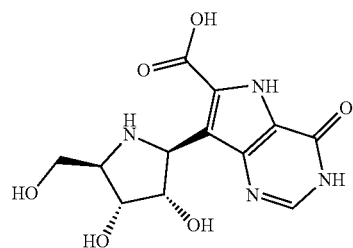 [SMILES: O=C(O)c1[nH]c2c(=O)[nH]cnc2c1[C@@H]1N[C@H](CO)[C@@H](O)[C@H]1O]
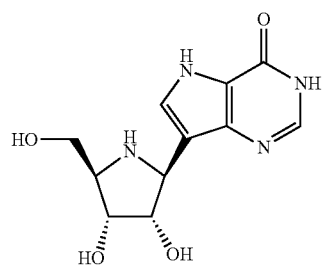 [SMILES: O=c1[nH]cnc2c([C@@H]3N[C@H](CO)[C@@H](O)[C@H]3O)c[nH]c12]
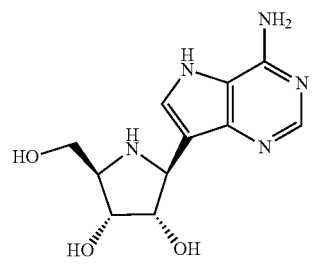 [SMILES: Nc1ncnc2c([C@@H]3N[C@H](CO)[C@@H](O)[C@H]3O)c[nH]c12]
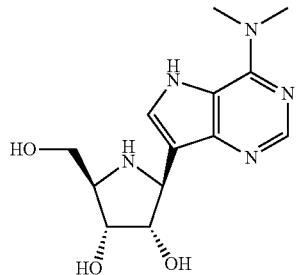 [SMILES: CN(C)c1ncnc2c([C@@H]3N[C@H](CO)[C@@H](O)[C@H]3O)c[nH]c12]

TABLE 1-continued
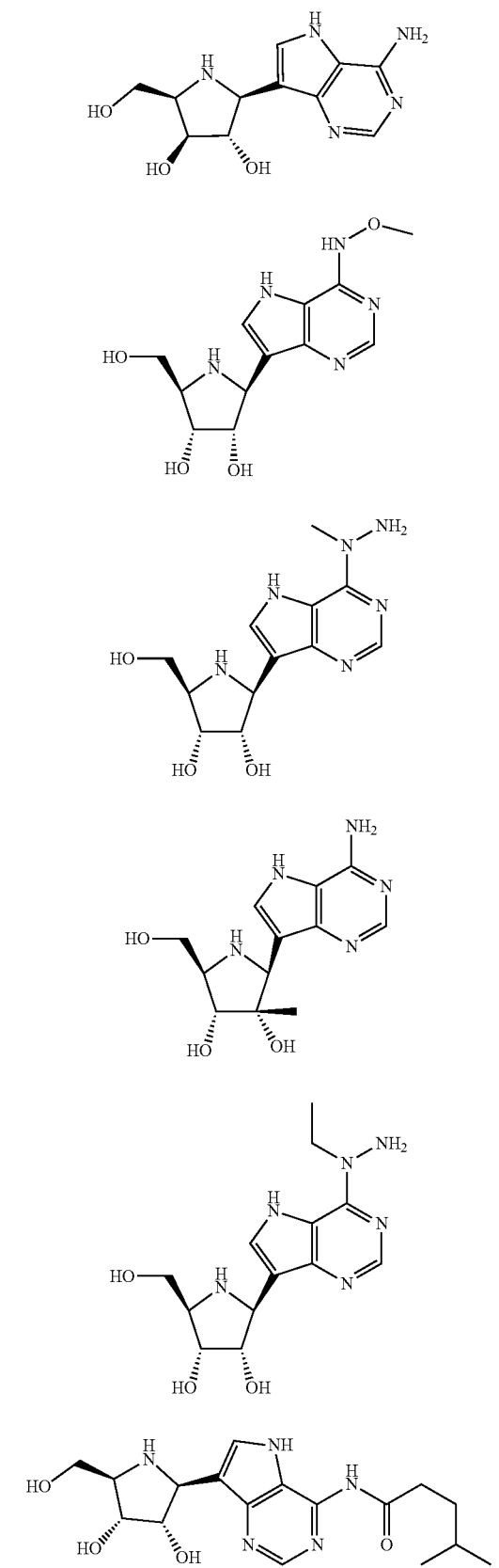

TABLE 1-continued
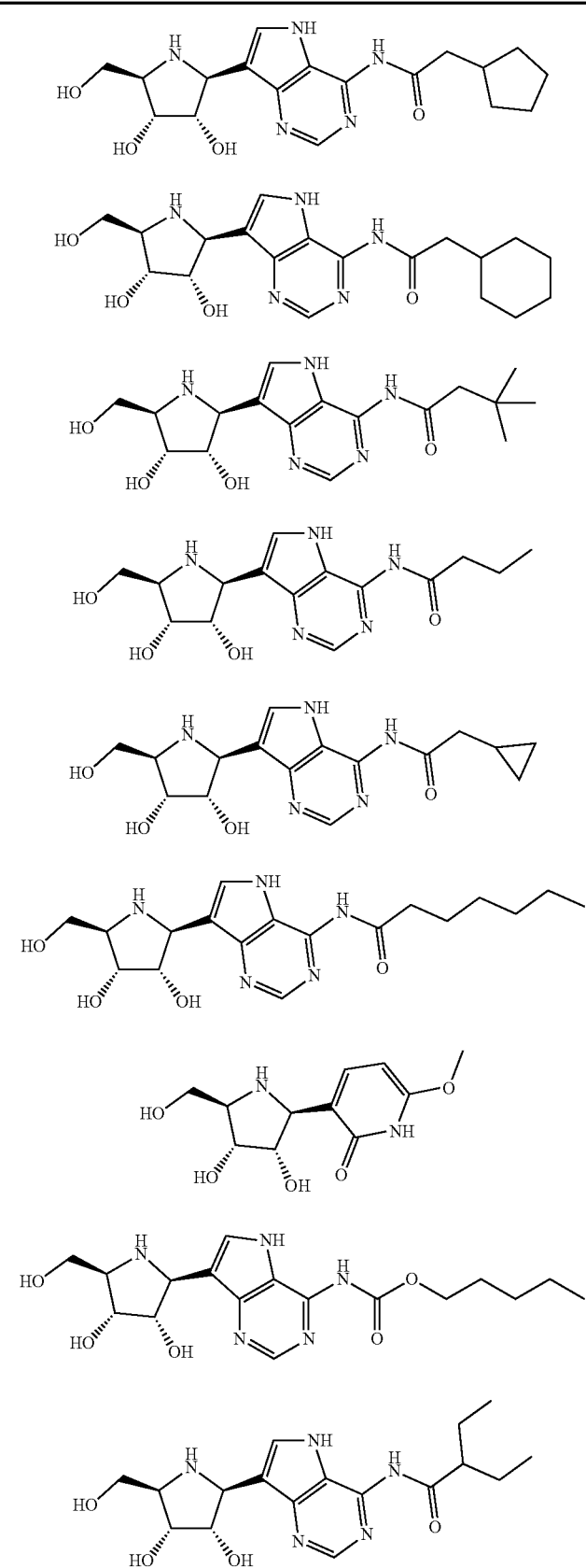

TABLE 1-continued
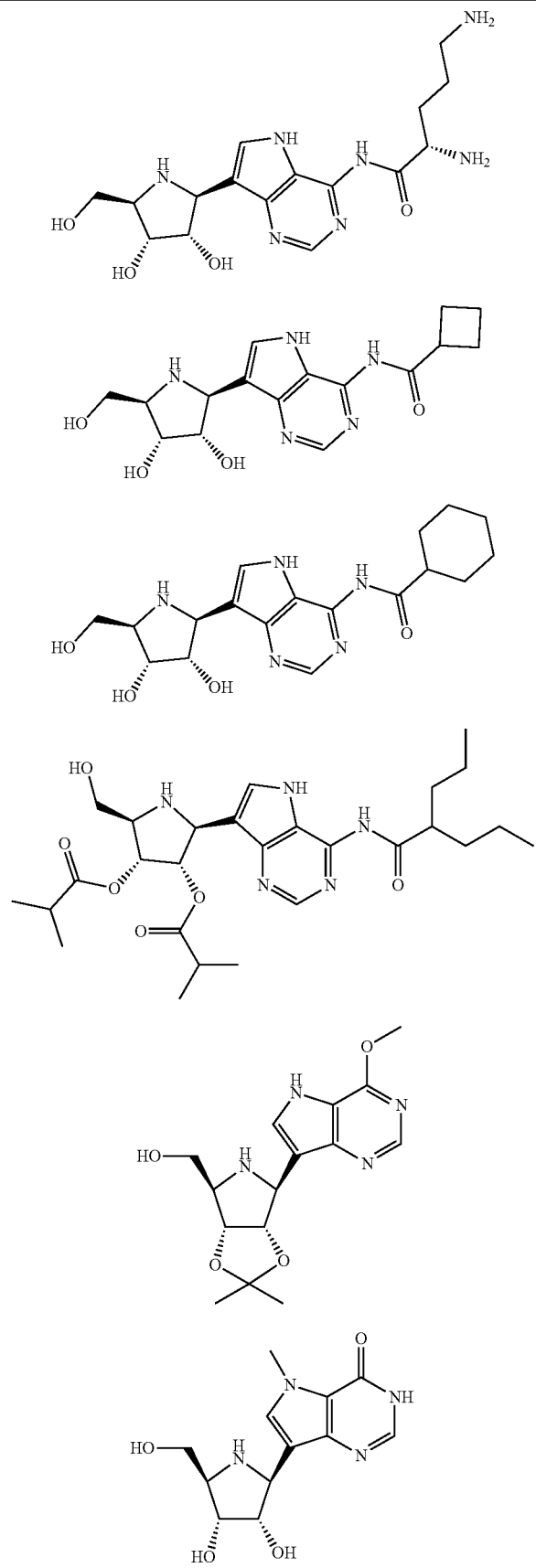

TABLE 1-continued
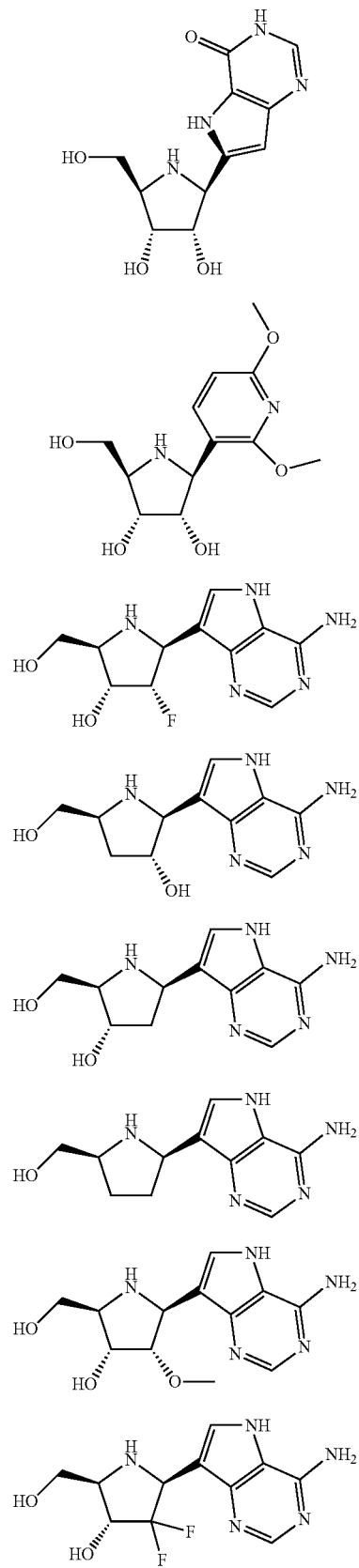

TABLE 1-continued
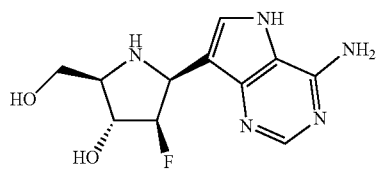 [SMILES: Nc1ncnc2c([C@@H]3N[C@H](CO)[C@@H](O)[C@@H]3F)c[nH]c12]
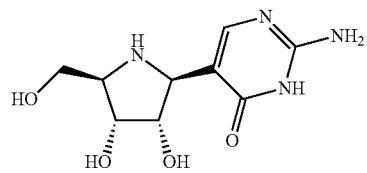 [SMILES: Nc1ncc([C@@H]2N[C@H](CO)[C@@H](O)[C@H]2O)c(=O)[nH]1]
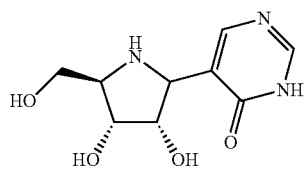 [SMILES: O=c1[nH]cncc1C1N[C@H](CO)[C@@H](O)[C@H]1O]
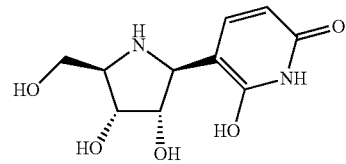 [SMILES: O=c1ccc([C@@H]2N[C@H](CO)[C@@H](O)[C@H]2O)c(O)[nH]1]
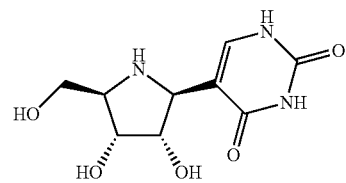 [SMILES: O=c1[nH]cc([C@@H]2N[C@H](CO)[C@@H](O)[C@H]2O)c(=O)[nH]1]
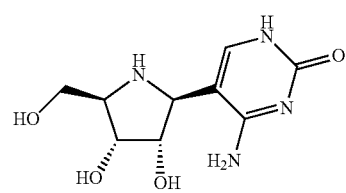 [SMILES: Nc1nc(=O)[nH]cc1[C@@H]1N[C@H](CO)[C@@H](O)[C@H]1O]
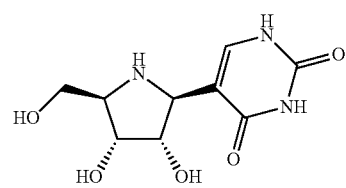 [SMILES: O=c1[nH]cc([C@@H]2N[C@H](CO)[C@@H](O)[C@H]2O)c(=O)[nH]1]
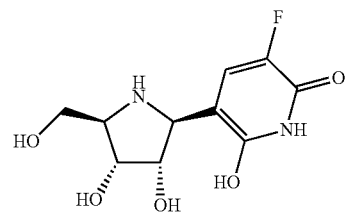 [SMILES: O=c1[nH]c(O)c([C@@H]2N[C@H](CO)[C@@H](O)[C@H]2O)cc1F]

TABLE 1-continued
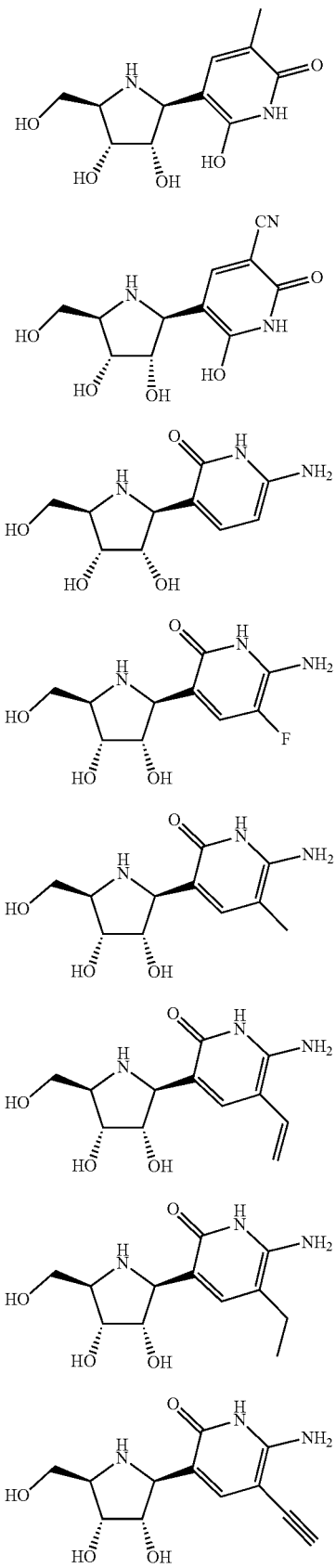

TABLE 1-continued

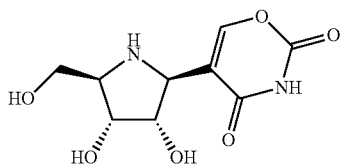

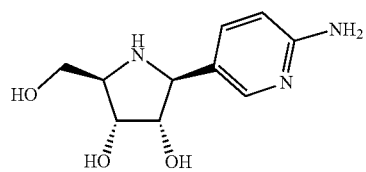 [SMILES: Nc1ccc([C@@H]2N[C@H](CO)[C@@H](O)[C@H]2O)cn1]

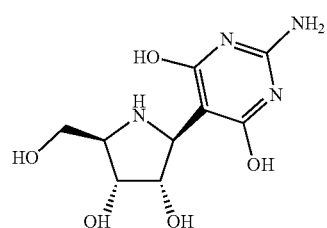 [SMILES: Nc1nc(O)c([C@@H]2N[C@H](CO)[C@@H](O)[C@H]2O)c(O)n1]

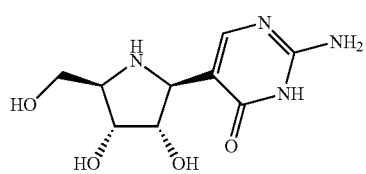 [SMILES: Nc1ncc([C@@H]2N[C@H](CO)[C@@H](O)[C@H]2O)c(=O)[nH]1]

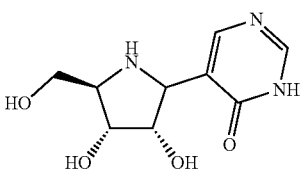 [SMILES: O=c1[nH]cncc1C1N[C@H](CO)[C@@H](O)[C@H]1O]

In certain embodiments, the invention provides a method of preparing compound 1b1 or a salt thereof:

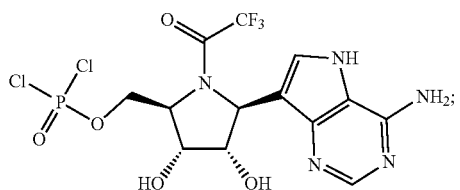

1b1 comprising combining compound 1b or a salt thereof and a phosphorylation reagent, thereby producing compound 1b1 or a salt thereof.

Likewise, in certain embodiments the invention provides a method of preparing compound 2b1 or a salt thereof:

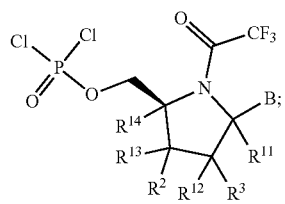

2b1 comprising combining compound 2b or a salt thereof and a phosphorylation reagent, thereby producing compound 2b1 or a salt thereof, wherein the variables in compound 2b1 are as defined herein.

In certain embodiments, the phosphorylation reagent comprises phosphorus oxychloride.

In certain embodiments, combining compound 1b or a salt thereof or compound 2b or a salt thereof and the phosphorylation reagent occurs in the presence of an organic solvent. In certain embodiments, the solvent is trimethylphosphate. In certain embodiments, combining compound 1b or a salt thereof or compound 2b or a salt thereof and the phosphorylation reagent occurs at about 0° C.

In certain embodiments, the method further comprises combining compound 1b1 or a salt thereof or compound 2b1 or a salt thereof with a pyrophosphate reagent, thereby producing compound 1c or a salt thereof or compound 2c or a salt thereof. In certain embodiments, the step of combining compound 1b1 or a salt thereof or compound 2b1 or a salt thereof with a pyrophosphate reagent is performed after combining compound 1b or a salt thereof or compound 2b or a salt thereof and a phosphorylation reagent.

In certain embodiments, the pyrophosphate reagent is pyrophosphoric acid or a pyrophosphate salt. In certain embodiments, the pyrophosphate reagent is a pyrophosphate salt. In certain embodiments, the pyrophosphate salt comprises one or more organic cations or inorganic cations. In certain embodiments, the cation is an inorganic cation selected from ammonium, alkali metals, and alkaline earth metals. In certain embodiments, the cation is an organic cation selected from lysine, arginine, tromethamine, hydroxypyrrolidine, triethanolamine, and N-methylglucamine. In certain embodiments, the cation is a trialkylammonium. In certain embodiments, the cation is tributylammonium. In certain such embodiments, the pyrophosphate salt is bis(tributylammonium)pyrophosphate.

In certain embodiments, combining compound 1b1 or a salt thereof or compound 2b1 or a salt thereof and the pyrophosphate reagent occurs in the presence of an organic solvent. In certain embodiments, the solvent is a polar aprotic solvent such as acetone, acetonitrile, dichloromethane (DCM), dimethyl sulfoxide (DMSO), ethyl acetate, hexamethylphosphoric triamide (HMPT), N,N-dimethylformamide (DMF), or tetrahydrofuran (THF). In some embodiments, the solvent is acetonitrile.

In certain embodiments, combining compound 1b1 or a salt thereof or compound 2b1 or a salt thereof and the pyrophosphate reagent occurs at about 0° C.

In certain embodiments, the method does not comprise isolating compound 1b1 or a salt thereof or compound 2b1 or a salt thereof. For example, in certain embodiments, the method does not comprise purifying compound 1b1 or a salt thereof or compound 2b1 or a salt thereof prior to its combination with pyrophosphate reagent. In certain embodiments, the step of combining compound 1b1 or a salt thereof or compound 2b1 or a salt thereof with a pyrophosphate reagent is performed in situ.

In certain embodiments, the method comprises combining compound 1e or a salt thereof or compound 2c or a salt thereof and a deprotection reagent, thereby producing compound 1 or a salt thereof or compound 2 or a salt thereof. In certain embodiments, the deprotection reagent is an acid or a base. In certain embodiments, the deprotection reagent is aqueous ammonia or an amine. In certain embodiments, the deprotection reagent is aqueous ammonia.

In certain embodiments, the method further comprises combining compound 1a or a salt thereof or compound 2a or a salt thereof and an acylating reagent, thereby producing compound 1b or a salt thereof or compound 2b or a salt thereof. In certain embodiments, the acylating reagent has the following structure:

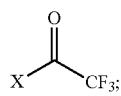

and X represents a leaving group. In certain embodiments, X is O-alkyl. In certain embodiments, the acylating reagent is ethyl trifluoroacetate.

In certain embodiments, the step of combining compound 1a or a salt thereof or compound 2a or a salt thereof and the acylating reagent further comprises a base. In certain embodiments, the base is an amine base. Exemplary amine bases include heteroaromatic amine bases and tertiary amine bases such as trimethylamine, triethylamine, diisopropylamine, N-methylpiperidine, pyridine, 2,6-lutidine, N-methylpyrrole, and N,N-dimethylaniline. In certain embodiments, the deprotection reagent is a reducing agent. In certain embodiments, the base is triethylamine.

In certain embodiments, combining compound 1a or a salt thereof or compound 2a or a salt thereof and the acylating reagent occurs in the presence of an organic solvent. In certain embodiments, the solvent is a polar protic solvent, such as acetic acid, ammonia, ethanol, formic acid, isopropanol, methanol, n-butanol, nitromethane, n-propanol, t-butanol, or water. In some embodiments, the solvent is methanol.

In certain embodiments, combining compound 1a or a salt thereof or compound 2a or a salt thereof and the acylating reagent occurs at about 0° C. In certain embodiments, the reaction is allowed to warm to about room temperature.

In certain embodiments, the method further comprises purifying compound 1 or a salt or compound 2 or a salt thereof thereof via chromatography. In some embodiments, the chromatography is column chromatography. In some embodiments, the chromatography comprises anion-exchange chromatography. In some embodiments, the chromatography comprises diethylaminoethyl (DEAE) ion exchange column chromatography. In some embodiments, the chromatography comprises reverse-phase chromatography. In some embodiments, the reverse-phase chromatography is performed on a C-18 column.

In some embodiments, the column chromatography comprises (step i) anion-exchange chromatography; followed by (step ii) reverse-phase chromatography; followed by (step iii) anion-exchange chromatography. In some embodiments, at least one of the column chromatography steps i-iii comprises a gradient of an aqueous buffer as a mobile phase. In some embodiments, the aqueous buffer is aqueous triethylammonium bicarbonate.

In some embodiments, the method further comprises drying compound 1 or a salt thereof or compound 2 or a salt thereof prior to the purification step.

In certain embodiments, the invention provides a compound having the structure:

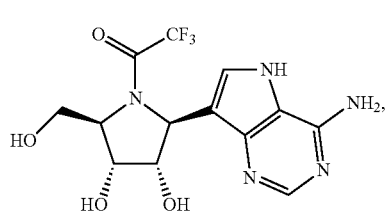

or a salt thereof.

Likewise, in certain embodiments the invention provides a compound having the structure:

43

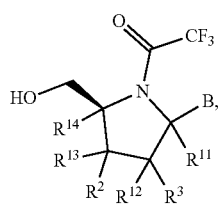

2b wherein the variables in compound 2b are as defined herein.

Examples

The present invention is further illustrated by the following examples, which in no way should be construed as limiting the scope of the claimed invention.

Materials and Methods

All materials were obtained from commercial suppliers and used without further purification unless otherwise noted. Anhydrous solvents were obtained from Sigma-Aldrich and used directly. Reactions involving air- or moisture-sensitive reagents were performed under a nitrogen or argon atmosphere. Silica gel chromatography was performed using prepacked silica gel columns (RediSep Rf, Teledyne ISCO). Reverse-phase purification was performed using prepacked C18 columns (EZ-prep, Teledyne ISCO). NMR spectra were acquired on Bruker 300 MHz spectrometers equipped with 5 mm BBFO probes. Chemical shifts are reported in parts per million (ppm) on a δ scale, and referenced to the residual solvent peak ($^1$H: 7.26 ppm for CDCl$_3$, 2.49 ppm for DMSO-d$_6$). Coupling constants (J) are reported in Hertz. Multiplicity abbreviations used: (s)—singlet, (d)—doublet, (dd)—doublet of doublet, (t)—triplet, (q)—quartet, and (m)—multiplet, and (br)—broad signal.

Synthesis of Compound 1.

Compound 1 (((2R,3R,4S,5S)-5-(4-amino-5H-pyrrolo[3,2-d]pyrimidin-7-yl)-3,4-dihydroxypyrrolidin-2-yl)methyl tetrahydrogen triphosphate) was generated according to a synthetic scheme that avoided protection of the 2' and 3' positions and directed addition of the triphosphate selectively to the 5' phosphate in the presence of the other free hydroxyls and amines, as shown below in Scheme 2. The cyclic amine of the azasugar was first protected as the trifluoroacetamide derivative by treatment with ethyl trifluoroacetate in the presence of triethylamine. This was followed by treatment with phosphorus oxychloride (POCl$_3$) according to the Yoshikawa protocol to afford the reactive 5'-phosphorodichlorate. In-situ treatment with bis(tributylammonium)pyrophosphate then gave the N-protected triphosphate. The penultimate intermediate was then deprotected by treatment with ammonia in methanol/water to afford the desired triphosphate, Compound 1, in 14.95% overall yield.

Scheme 2. Synthesis of Compound 1

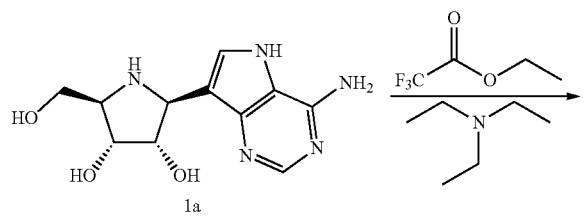

44

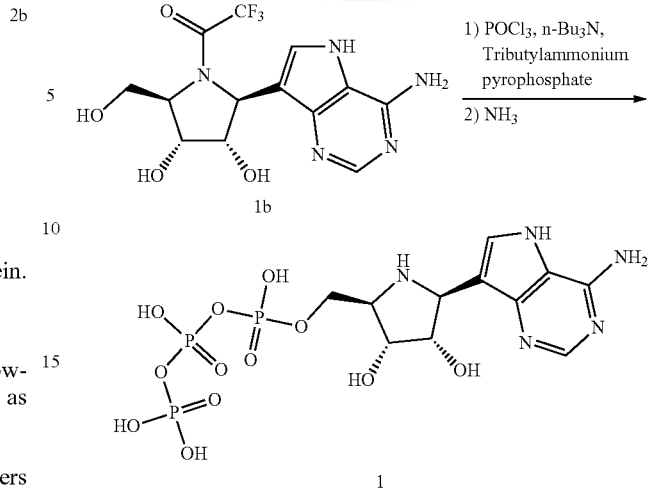

Preparation and Characterization of 1-((2S,3S,4R,5R)-2-(4-amino-5H-pyrrolo[3,2-d]pyrimidin-7-yl)-3,4-dihydroxy-5-(hydroxymethyl)pyrrolidin-1-yl)-2,2,2-trifluoroethanone (1b)

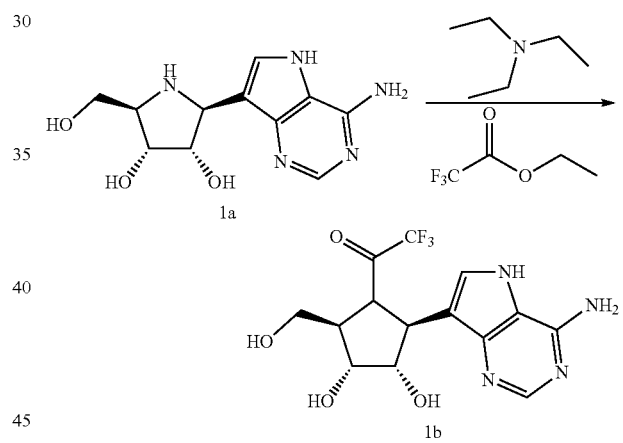

To an ice-cold solution of (2S,3S,4R,5R)-2-(4-amino-5H-pyrrolo[3,2-d]pyrimidin-7-yl)-5-(hydroxymethyl)pyrrolidine-3,4-diol, 2HCl (2 g, 5.91 mmol) in dry MeOH (40 mL) under inert atmosphere was added TEA (2.72 mL, 19.52 mmol) and ethyl 2,2,2-trifluoroacetate (0.882 mL, 7.39 mmol) in small portions. The reaction was allowed to warm to room temperature and stirred overnight. The reaction mixture was concentrated under reduced pressure and purified by reverse-phase column chromatography [EZ-PREP, C-18 column, 50 g, eluting with 0.1% aqueous HCl in water and acetonitrile from 0-100%] to give pure 1-((2S,3S,4R,5R)-2-(4-amino-5H-pyrrolo[3,2-d]pyrimidin-7-yl)-3,4-dihydroxy-5-(hydroxymethyl)pyrrolidin-1-yl)-2,2,2-trifluoroethanone (1b) (1.8 g, 84%) as a white solid. $^1$H NMR (300 MHz, DMSO-d$_6$) δ 12.79 (d, J=9.9 Hz, 1H), 8.91 (d, J=32.3 Hz, 2H), 8.57 (s, 1H), 8.03 (dd, J=39.0, 3.1 Hz, 1H), 5.40-4.93 (m, 1H), 4.60-4.48 (m, 1H), 4.25-3.82 (m, 3H), 3.78-3.64 (m, 2H); $^{19}$F NMR (282 MHz, DMSO) δ −69.48; MS (ES+): 362.1 (M+H); Analysis calculated for Preparation and Characterization of ((2R,3R,4S, 5S)-5-(4-amino-5H-pyrrolo[3,2-d]pyrimidin-7-yl)-3, 4-dihydroxypyrrolidin-2-yl)methyl Tetrahydrogen Triphosphate (1)

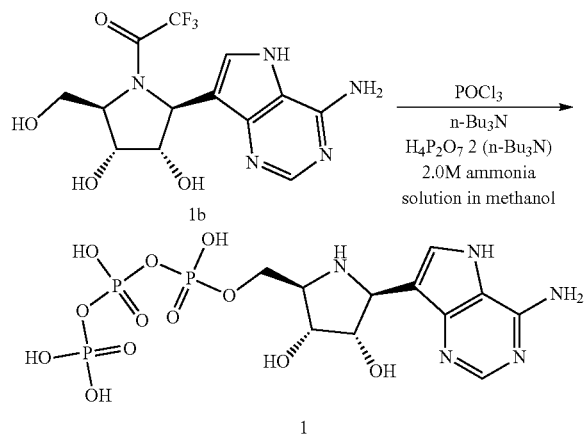

To a suspension 1-((2S,3S,4R,5R)-2-(4-amino-5H-pyrrolo[3,2-d]pyrimidin-7-yl)-3,4-dihydroxy-5-(hydroxymethyl)pyrrolidin-1-yl)-2,2,2-trifluoroethanone (1b) (0.361 g, 1 mmol) in trimethylphosphate (4.5 mL) cooled with ice/water was added phosphoryl trichloride (0.186 mL, 2.0 mmol) and stirred at 0° C. for 4 h under N2. To the reaction mixture was added a solution of of tributylammonium pyrophosphate salt (1.097 g, 2.000 mmol) in acetonitrile (3.00 mL) followed by tributylamine (1.451 mL, 6.00 mmol). The reaction mixture was stirred at 0° C. for 0.5 h under N2 and then quenched by the addition of triethylammonium bicarbonate buffer (1 M, 12 mL). The resulting mixture was stirred at room temperature for 30 min and added triethylamine (1.2 mL). The mixture was stirred an additional 30 min and concentrated under reduced pressure and co-evaporated with water. The result mixture was taken in 2.0 M ammonia solution in methanol (15.00 mL, 30.0 mmol) and was stirred at room temperature for 16 h. Additional ammonia in water (5 mL, 90 mmol) was added and stirred at room temperature for 5 h. After the supernatant was removed, the result solid mixture was dissolved in water and purified by DEAE ion exchange column chromatography with a linear gradient of TEAB buffer (1M TEAB buffer, pH=8.0/H$_2$O, 0:1 to 1:0, total: 500 mL) followed by purification by reverse-phase column chromatography [EZ-PREP, C-18 column, 50 g, eluting with CH$_3$CN/0.1 M TEAB buffer, pH=8.0, 0-20 min, 0-35% CH$_3$CN] to afford crude 1 (120 mg). The crude was repurified by DEAE ion exchange column chromatography with a linear gradient of TEAB buffer (1M TEAB buffer, pH=8.0/H$_2$O, 0:1 to 1:0, total: 500 mL) to afford ((2R,3R,4S,5S)-5-(4-amino-5H-pyrrolo[3,2-d]pyrimidin-7-yl)-3,4-dihydroxypyrrolidin-2-yl)methyl tetrahydrogen triphosphate (1). (90 mg, 0.178 mmol, 17.81% yield). δ 8.13 (s, 1H), 7.83 (s, 1H), 4.79 (d, J=8.6 Hz, 1H), 4.57 (dd, J=8.6, 5.3 Hz, 1H), 4.41-4.17 (m, 3H), 3.87 (s, 1H), 3.07 (q, J=7.3 Hz, 18H), 1.14 (t, J=7.3 Hz, 27H). $^{31}$P NMR (121 MHz, Deuterium Oxide) 6-7.31 (d, J=21.0 Hz), −11.53 (d, J=19.4 Hz), −22.26--22.77 (m). MS (ES-): 503.9 (M−1); HPLC (Zorbax C18, 10×4.6 mm, 1.8 μm, "A" Buffer=(10 mM Octanesulfonic acid, 10 mL Acetic acid/L, 100 mL Acetonitrile in 900 mL Water), "B" Buffer=60% water, 40% Acetonitrile, UV Absorbance 240 nm; Rt=3.930 min (96.09%).

INCORPORATION BY REFERENCE

All US and PCT patent application publications and US patents mentioned herein are hereby incorporated by reference in their entirety as if each individual patent application publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

What is claimed is:

1. A method of preparing compound 2b1 or a salt thereof:

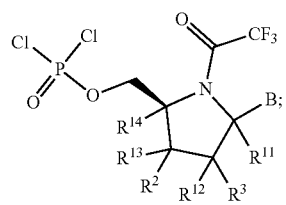

comprising combining compound 2b or a salt thereof and a phosphorylation reagent, thereby producing compound 2b1 or a salt thereof;

wherein:

compound 2b is represented by

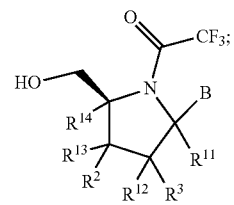

B is a heterocyclic base;

R$^o$, independently for each occurrence, is selected from the group consisting of H, C$_1$-C$_6$alkyl, and C(O)—C$_1$-C$_6$alkyl;

R$^2$ and R$^3$ are each independently H, halide, azide, C$_1$-C$_6$alkyl, C$_1$-C$_6$alkenyl, C$_1$-C$_6$alkynyl, CN, OR$^o$, —C(O)OR$^{10}$, or SR$^o$;

or R$^2$ and R$^3$, taken together with the intervening atoms, form an optionally substituted fused heterocycloalkyl;

$R^{10}$, independently for each occurrence, is selected from the group consisting of H, $C_1$-$C_6$alkyl, aryl, heteroaryl, aralkyl, and heteroaralkyl;

$R^{11}$ is selected from the group consisting of H, $C_1$-$C_6$alkyl, $C_1$-$C_6$alkenyl, $C_1$-$C_6$alkynyl, $OR^O$, and CN;

$R^{12}$ and $R^{13}$ are each independently selected from the group consisting of H, $C_1$-$C_6$alkyl, $OR^O$, $C_1$-$C_6$alkenyl, $C_1$-$C_6$alkynyl, CN, azide, and halide; and $R^{14}$ is selected from the group consisting of H, $C_1$-$C_6$alkyl, $OR^O$, $C_1$-$C_6$alkynyl, CN, azide, and halide.

2. The method of claim 1, wherein the phosphorylation reagent comprises phosphorus oxychloride.

3. The method of claim 1, further comprising subsequently combining compound 2b1 or a salt thereof with a pyrophosphate reagent, thereby producing compound 2c or a salt thereof;
wherein:
compound 2c is represented by

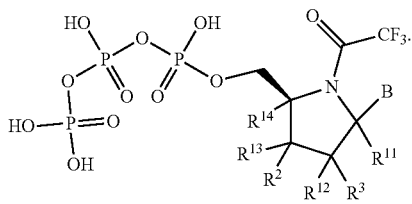

2c

4. The method of claim 3, wherein the pyrophosphate reagent is pyrophosphoric acid or a pyrophosphate salt.

5. The method of claim 4, wherein the pyrophosphate reagent is a pyrophosphate salt.

6. The method of claim 5, wherein the pyrophosphate salt is bis(tributylammonium)pyrophosphate.

7. The method of claim 1, wherein the method does not comprise isolating compound 2b1 or a salt thereof.

8. The method of claim 1, comprising combining compound 2c or a salt thereof and a deprotection reagent, thereby producing compound 2 or a salt thereof;
wherein:
compound 2 is represented by

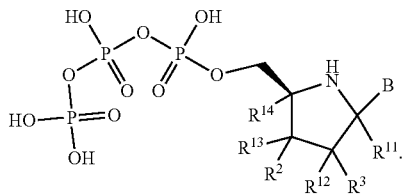

2

9. The method of claim 8, wherein the deprotection reagent is aqueous ammonia or an amine.

10. The method of claim 9, wherein the deprotection reagent is aqueous ammonia.

11. The method of claim 1, further comprising combining compound 2a or a salt thereof and an acylating reagent, thereby producing compound 2b or a salt thereof; wherein:
compound 2a is represented by

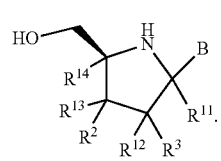

2a

12. The method of claim 11, wherein the acylating reagent has the following structure:

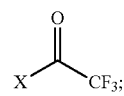

and X represents a leaving group.

13. The method of claim 12, wherein X is O-alkyl.

14. The method of claim 11, wherein the acylating reagent is ethyl trifluoroacetate.

15. The method of claim 11, wherein the step of combining compound 2a or a salt thereof and the acylating reagent further comprises a base.

16. The method of claim 15, wherein the base is triethylamine.

17. The method of claim 1, further comprising purifying compound 2 or a salt thereof via chromatography.

18. The method of claim 17, wherein the chromatography is column chromatography.

19. The method of claim 18, wherein the column chromatography comprises anion-exchange chromatography and reverse-phase chromatography.

20. The method of claim 19, wherein the column chromatography comprises (step i) anion-exchange chromatography; (step ii) reverse-phase chromatography; and (step iii) anion-exchange chromatography.

21. The method of claim 20, wherein at least one of the column chromatography steps i-iii comprises a gradient of an aqueous buffer as a mobile phase.

22. The method of claim 21, wherein the aqueous buffer is aqueous triethylammonium bicarbonate.

23. The method of claim 17, further comprising drying compound 2 or a salt thereof prior to the purification step.

24. The method of claim 1, wherein compound 2b1 has the structure of compound 1b1:

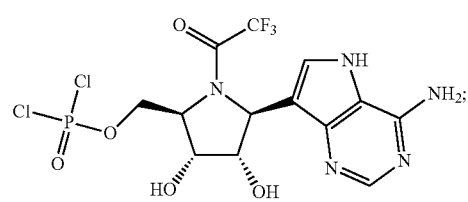

1b1 and compound 2b has the structure of compound 1b:

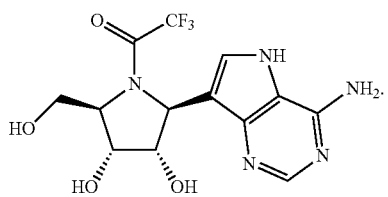

25. The method of claim 3, wherein compound 2c has the structure of compound 1c:

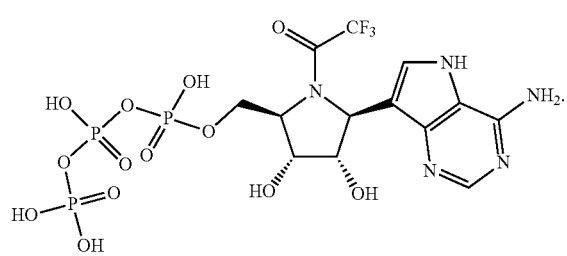

26. The method of claim 8, wherein compound 2 has the structure of compound 1:

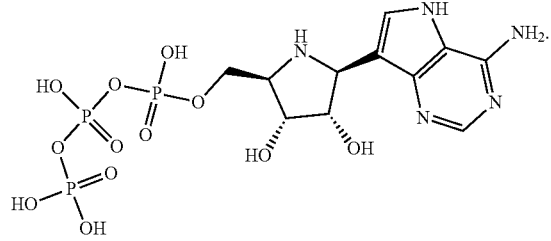

27. The method of claim 11, wherein compound 2a has the structure of compound 1a:

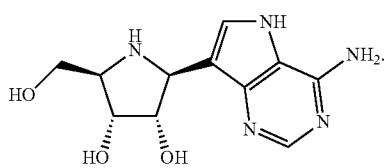

28. A compound having the structure:

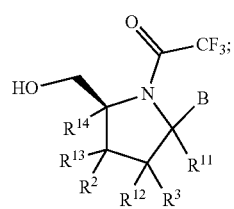

wherein:
B is a heterocyclic base;
$R^0$, independently for each occurrence, is selected from the group consisting of H, $C_1$-$C_6$alkyl, and C(O)—$C_1$-$C_6$alkyl;
$R^2$ and $R^3$ are each independently H, halide, azide, $C_1$-$C_6$alkyl, $C_1$-$C_6$alkenyl, $C_1$-$C_6$alkynyl, CN, $OR^0$, —C(O)$OR^{10}$, or $SR^0$;
or $R^2$ and $R^3$, taken together with the intervening atoms, form an optionally substituted fused heterocycloalkyl;
$R^{10}$, independently for each occurrence, is selected from the group consisting of H, $C_1$-$C_6$alkyl, aryl, heteroaryl, aralkyl, and heteroaralkyl;
$R^{11}$ is selected from the group consisting of H, $C_1$-$C_6$alkyl, $C_1$-$C_6$alkenyl, $C_1$-$C_6$alkynyl, $OR^0$, and CN;
$R^{12}$ and $R^{13}$ are each independently selected from the group consisting of H, $C_1$-$C_6$alkyl, $OR^0$, $C_1$-$C_6$alkenyl, $C_1$-$C_6$alkynyl, CN, azide, and halide; and
$R^{14}$ is selected from the group consisting of H, $C_1$-$C_6$alkyl, $OR^0$, $C_1$-$C_6$alkynyl, CN, azide, and halide.

29. The compound of claim 28, wherein the compound has a structure selected from the group consisting of

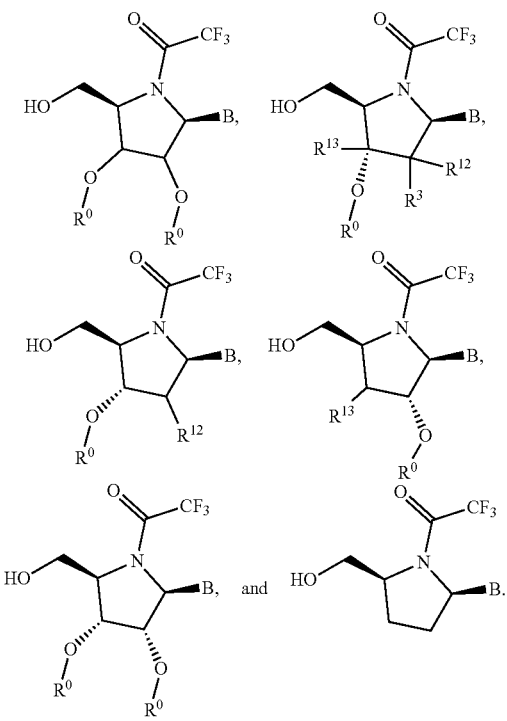

30. The compound of claim 28, wherein the compound has a structure selected from the group consisting of:

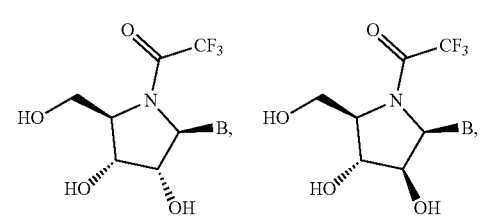

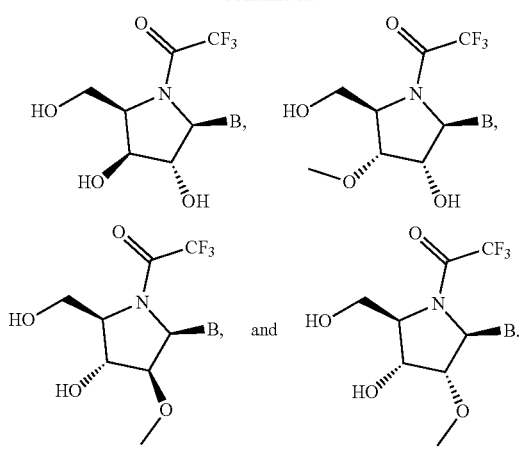
31. The compound of claim 28, wherein the compound has a structure selected from the group consisting of:
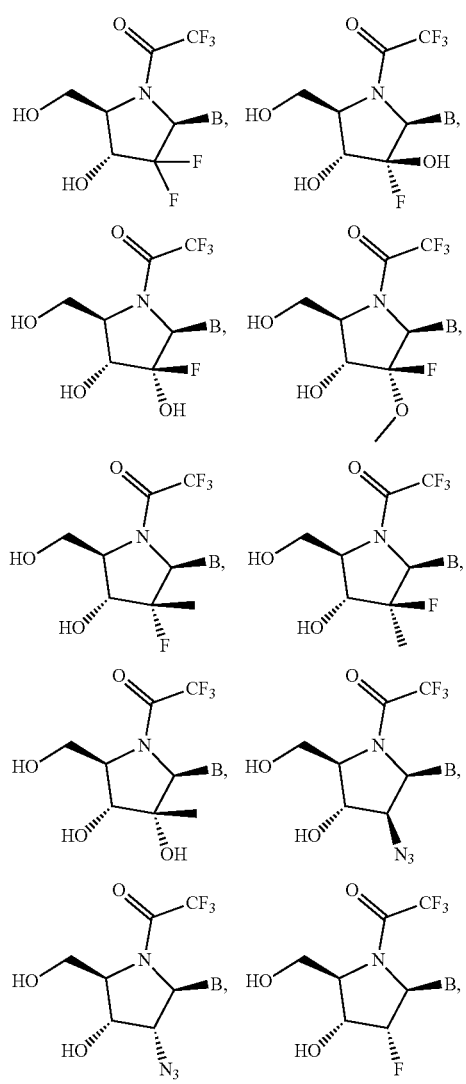
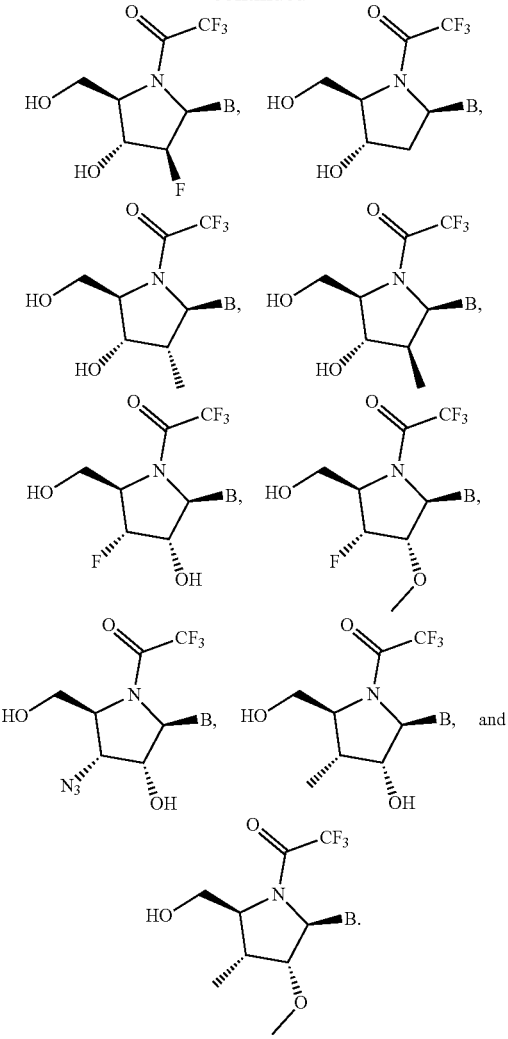
32. The compound of claim 28, wherein the compound has the structure:
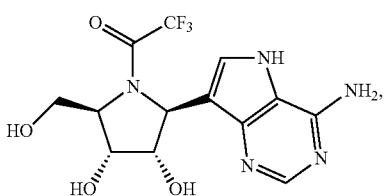
or a salt thereof.
33. A compound having the structure:
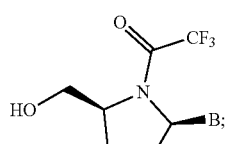
wherein:
B is a heterocyclic base.
* * * * *